United States Patent
Arkko et al.

(10) Patent No.: US 12,500,862 B2
(45) Date of Patent: Dec. 16, 2025

(54) GENERATING OR PROVIDING IPV6 ADDRESSES

(71) Applicant: Telefonaktiebolaget LM Ericsson (publ), Stockholm (SE)

(72) Inventors: Jari Arkko, Kauniainen (FI); Ari Keränen, Helsinki (FI); Jan Backman, Kärna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 18/686,167

(22) PCT Filed: Aug. 25, 2021

(86) PCT No.: PCT/EP2021/073533
§ 371 (c)(1),
(2) Date: Feb. 23, 2024

(87) PCT Pub. No.: WO2023/025383
PCT Pub. Date: Mar. 2, 2023

(65) Prior Publication Data
US 2024/0356893 A1    Oct. 24, 2024

(51) Int. Cl.
*H04L 61/5007* (2022.01)
*H04L 61/5038* (2022.01)
*H04L 101/659* (2022.01)
*H04L 101/668* (2022.01)

(52) U.S. Cl.
CPC ...... *H04L 61/5007* (2022.05); *H04L 61/5038* (2022.05); *H04L 2101/659* (2022.05); *H04L 2101/668* (2022.05)

(58) Field of Classification Search
CPC ............ H04L 61/5007; H04L 61/5038; H04L 2101/659; H04L 2101/668; H04L 61/251;
(Continued)

(56) References Cited

U.S. PATENT DOCUMENTS 7,154,891 B1 * 12/2006 Callon ................ H04L 61/00 370/392
11,356,925 B1 * 6/2022 Stevens ............... H04B 1/0003
(Continued)

FOREIGN PATENT DOCUMENTS

| EP | 1841183 B1 | 3/2013 |
| EP | 2309702 B1 | 2/2019 |
| WO | 2018184684 A1 | 10/2018 |

OTHER PUBLICATIONS

International Search Report and Written Opinion dated May 6, 2022 for International Application No. PCT/EP2021/073533 filed Aug. 25, 2021; consisting of 15 pages.
(Continued)

*Primary Examiner* — Jerry B Dennison
(74) *Attorney, Agent, or Firm* — Weisberg I.P. Law, P.A.

(57) ABSTRACT

A technique for generating an internet protocol, IP, address according to IPv6, for access to one of a plurality of wireless devices connected or connectable to a wireless network from an application node in a communications network is provided. As to a method aspect of the technique, an IPv6 address for access from the application node in the communications network to a respective one of the wireless devices is generated based on a subnet identifier of the wireless network and a device identifier of the respective one of the wireless devices. The generated IPv6 address is provided for the access from the application node in the communications network.

13 Claims, 10 Drawing Sheets

300

Generate an IPv6 address for access from an application node in a communications network to a respective one of wireless devices, wherein the IPv6 address is generated based on a subnet identifier of a wireless network and a device identifier of the respective one of the wireless devices — 302

Provide the generated IPv6 address for the access from the application node in the communications network — 304

(58) Field of Classification Search
CPC ............. H04L 61/2517; H04L 61/5092; H04L 61/4588; H04L 61/5076; H04L 61/2514
See application file for complete search history.

(56) References Cited

U.S. PATENT DOCUMENTS

| | | | | |
|---|---|---|---|---|
| 12,192,101 | B2* | 1/2025 | Pei | H04L 45/74 |
| 2004/0264465 | A1* | 12/2004 | Dunk | H04L 63/166 |
| | | | | 370/392 |
| 2006/0239266 | A1* | 10/2006 | Babbar | H04L 61/5084 |
| | | | | 370/392 |
| 2011/0158160 | A1* | 6/2011 | McCullough | H04L 69/169 |
| | | | | 370/328 |
| 2014/0215087 | A1* | 7/2014 | Zhao | H04W 80/04 |
| | | | | 709/231 |
| 2015/0237007 | A1* | 8/2015 | Liu | H04L 61/5007 |
| | | | | 370/329 |
| 2017/0332420 | A1* | 11/2017 | Cui | H04W 76/11 |
| 2019/0124040 | A1* | 4/2019 | Avula | H04W 76/12 |
| 2019/0158453 | A1* | 5/2019 | Ståhl | H04L 63/0245 |
| 2020/0267116 | A1* | 8/2020 | Osterberg | H04L 61/5092 |
| 2023/0354144 | A1* | 11/2023 | Fu | H04W 40/02 |
| 2024/0356893 | A1* | 10/2024 | Arkko | H04L 61/2514 |

OTHER PUBLICATIONS

3GPP TS 23.060 V16.0.0; 3rd Generation Partnership Project; Technical Specification Group Services and System Aspects; General Packet Radio Service (GPRS); Service description; Stage 2 (Release 16); Mar. 2019; consisting of 367 pages.

3GPP TS 23.221 V16.2.0; 3rd Generation Partnership Project; Technical Specification Group Services and System Aspects; Architectural requirements (Release 16); Jun. 2019; consisting of 53 pages.

3GPP TS 23.401 V17.1.0; 3rd Generation Partnership Project; Technical Specification Group Services and System Aspects; General Packet Radio Service (GPRS) enhancements for Evolved Universal Terrestrial Radio Access Network (E-UTRAN) access (Release 17); Jun. 2021; consisting of 446 pages.

Korhonen, J., et al.; IPV6 in 3rd Generation Partnership Project (3GPP) Evolved Packet System (EPS); Internet Engineering Task Force (IETF); Request for Comments: 6459; Category: Informational; ISSN: 2070-1721; Renesas Mobile; Jan. 2012; consisting of 36 pages.

Zimmerman, A., et al.; 6GLAD: IPV6 Global to Link-layer ADdress Translation for 6LoWPAN Overhead Reducing; 2008 Next Generation Internet Networks, Krakow, Poland, 2008, consisting of 6 pages.

The Structure; IPV6 NAT with Link-Local Address; Network Engineering Stack Exchange; Feb. 25, 2016; printed on Apr. 19, 2022; consisting of 4 pages.

Wasserman, M., et al., IPv6-to-IPv6 Network Address Translation (NAT66) draft-mrw-nat66-00.txt; Wasserman & Baker; Cisco Systems; Oct. 18, 2010; work in progress; consisting of 15 pages.

European Communication Pursuant to Article 94(3) EPC dated Dec. 9, 2024 issued in corresponding European Application No. 21 766 172.7, consisting of 6 pages.

* cited by examiner

530

532

1100

GENERATING OR PROVIDING IPV6 ADDRESSES

TECHNICAL FIELD

The present disclosure relates to a method of generating an internet protocol (IP) address according to IP version 6 (IPv6), a method of providing an IP address according to IPv6, a corresponding computer program product, a generator device for generating an IP address according to IPv6, an interface device for providing an IP address according to IPv6, and a communication system.

BACKGROUND

A wireless network provides radio access to wireless devices, e.g. according to Long Term Evolution (LTE) or Fifth Generation New Radio (5G NR) as specified by the Third Generation Partnership Project (3GPP). The wireless network is connected to an external internet protocol (IP) communications network. For example, the communications network may be an IPv6 domain outside of the wireless network, e.g., an IPv6 domain of the internet. While a network operator can control measures for network management, data security, and signal integrity within the wireless network, the communications network may be outside of a domain controlled by the network operator. Thus, controlling access from nodes in the communications network towards the wireless network can be essential for a reliable and secure operation of the wireless network and its wireless devices.

For a domain of the communications network using the IP according to version 4 (IPv4), the wireless network is fully aware of the assignment of IPv4 addresses to its wireless devices. Accordingly, the wireless network can provide the IPv4 addresses of certain wireless devices to an application node in the IPv4 domain of the communications network so that the application node can access the respective wireless devices.

However, this communication model for IPv4 has no counterpart for the IPv6 domain of the communications network. For the IPv6 domain, the wireless network may be aware only of a 64-bit prefix and the suggested 64-bit interface identifier for a link-local communication within the wireless network. But the wireless network may have no knowledge of 64-bit interface identifiers used by the wireless devices for the IPv6 domain of the communications network, i.e., in combination with a global 64-bit prefix. As a result, the application node cannot initiate the access to its associated wireless devices, e.g., by sending "tap on shoulder" packets from the IPv6 domain of the communications network to its wireless devices in the wireless network.

This problem could be tackled in multiple approaches. A first approach could include changing the communication model between the wireless devices and the application node, e.g., to a communication initiated by the wireless device. But this first approach can increase the power consumption of the wireless device, which may be adverse for an IoT device. Furthermore, the first approach may be difficult to implement in some cases, e.g. due to the amount of signaling, which may be adverse for both latency and power consumption, or due to a secure communications tunnel, which may require a computational complexity unavailable at IoT devices. A second approach includes monitoring packets sent by the wireless devices and recording the most recently used source IPv6 addresses. But this approach is not entirely reliable. A third approach could include additional standardization in 3GPP to specify a new, full 128-bit address assignment. But this would take time and also limit the availability of addresses for wireless devices that need multiple addresses. A fourth approach could include treating the connection between the wireless device and the application node as an Ethernet network and giving the application node a layer-2 (L2) tunnel (e.g., a virtual private network, VPN) to the wireless device, so that the application node is on the same link with the wireless device and can send to the link-local address of the wireless device without network address translation (NAT) in between. But this VPN-type of connection is not as easy to setup compared to a regular IP-based connection between the wireless device and the application node.

SUMMARY

Accordingly, there is a need for a technique that enables access to individual wireless devices in a wireless network from an IPv6 domain outside of the wireless network.

As to a first method aspect, a method of generating an internet protocol (IP) address according to IP version 6 (IPv6) for access to one of a plurality of wireless devices connected or connectable to a wireless network from an application node in a communications network is provided. The method comprises a step of generating an IPv6 address for access from the application node in the communications network to a respective one of the wireless devices. The IPv6 address is generated based on a subnet identifier of the wireless network and a device identifier of the respective one of the wireless devices. The method further comprises a step of providing the generated IPv6 address for the access from the application node in the communications network.

The method may be performed in the wireless network, e.g., by a gateway and/or a network address translation (NAT) entity of the wireless network.

The communications network may be an IPv6 domain outside of the wireless network, e.g., an IPv6 domain of the internet. Alternatively or in addition, the wireless network may be a cellular network and/or a mobile network.

At least some embodiments of the technique can enable access to an individual wireless device in a wireless network from the communications network by generating the IPv6 address based on the subnet identifier and the device identifier, both of which may be known at the wireless network, so that the wireless network (e.g., the gateway and/or the NAT entity of the wireless network) can send (e.g., channel or direct or forward) traffic incoming from the IPv6 domain of the communications network to the respective one of the wireless devices based on the generated IPv6 address provided to the network node.

By providing the generated IPv6 address, the same or further embodiments can enable the wireless network to control incoming traffic for IPv6-connected (i.e., IPv6-addressable) wireless devices, e.g., cellular IoT wireless devices.

The (e.g., incoming or outgoing) traffic may comprise one or more data packets, e.g., towards or from the respective one of the wireless devices, respectively. Herein, the data packet may comprise payload data or control data (i.e., may be a control packet). The data packet may be briefly referred to as packet.

The generated IPv6 address may be provided, e.g., through an interface device, to the application node. The interface device may provide an interface of the wireless network towards the application node, e.g., for requesting a status of the at least one or each of the wireless devices associated with the application node. Particularly, the interface device may provide the generated IPv6 address of the respective one of the wireless devices to the application node. In an exemplary implementation, the interface device may provide an application programming interface (API) towards the application node. The interface device may also be referred to as API device.

Each of the one or more data packets in and/or from the communications network may comprise the generated IPv6 address as a destination address of the respective packet. Alternatively or in addition, the traffic (e.g., an initial data packet) from the application node to the respective one of the wireless devices may wake-up the respective one of the wireless devices.

The incoming traffic may be forwarded (e.g., routed) from the communications network to the wireless network, e.g., on an IP layer of a protocol stack for the traffic between the wireless device and the application node. Alternatively or in addition, the incoming traffic may be terminated at the respective one of the wireless devices, e.g., on a transport layer or an application layer of a protocol stack for the traffic between the wireless device and the application node.

The device identifier and/or the subnet prefix may be stored in a Packet Data Protocol (PDP) context of the respective one of the wireless devices. Alternatively or in addition, at least one or each of the device identifier and/or the subnet prefix may be assigned to the respective one of the wireless devices, e.g., by the gateway and/or the NAT entity.

Herein, an IP address according to IPv6 is briefly referred to as an IPv6 address. Furthermore, the IPv6 address for access from the communications network to the respective one of the wireless devices is briefly referred to as the generated IPv6 address.

The generated IPv6 address may be generated based on a combination of the subnet identifier of the wireless network and the device identifier of the respective one of the wireless devices. The combination may be a concatenation of the subnet identifier and the device identifier, a linear combination (e.g., an addition or a bitwise exclusive disjunction, i.e. XOR) of the subnet identifier and the device identifier, or a non-linear combination (e.g., a hash function) of the subnet identifier and the device identifier.

The generated IPv6 address may comprise 128 bits.

The combination may be a concatenation of bits representing the subnet identifier and bits representing the device identifier. For example, the generated IPv6 address may comprise a 64-bit prefix representing the subnet identifier and/or a 64-bit suffix (also referred to as interface identifier) representing the device identifier.

The wireless network may serve the plurality of wireless devices. The plurality of wireless devices may be a (e.g., proper) subset of wireless devices served by or wirelessly connected to the wireless network. For example, the plurality of wireless devices may be the subset of those wireless devices in the wireless network, which are used by or associated with the application node.

Herein, "the wireless devices" may refer to the plurality of wireless devices. Alternatively or in addition, "the wireless devices in the wireless network" may refer to wireless devices served by or wirelessly connected to the wireless network.

The step of generating an IPv6 address may comprise generating at least one IPv6 address for access from the communications network to the respective one or each of the wireless devices (e.g., each of the wireless devices in the plurality of wireless devices or each of the wireless devices in the wireless network).

The access may be a unicast access. In other words, the generated IPv6 address may enable access to only the respective one of the wireless devices. The access may be, or may not be, exclusive. In other words, the generated IPv6 address may, or may not, be the only IPv6 address for access to the respective one of the wireless devices.

At least some embodiments of the method enable the access by the application node (briefly: application-access) to the respective one of the wireless devices using the IPv6 address as a destination address in a data packet in the communications network. In the same or further embodiments, the generated IPv6 address enables the access to (i.e., enables accessing) the respective one of the wireless devices from the communications network. The generated IPv6 address may enable uniquely accessing the respective one of the wireless devices from the communications network.

The wireless devices may be wirelessly connected or connectable to the wireless network. Alternatively or in addition, the wireless network may be a cellular telecommunications network.

At least one or each of the wireless devices connected to the wireless network (e.g., the respective one of the wireless devices) may be a host in the wireless network. In other words, the wireless devices connected to the wireless network (e.g., the respective one of the wireless devices) may be in the wireless network in terms of network topology and/or for addressing the wireless devices.

The wireless network may comprise a wireless access network configured to provide wireless access to the plurality of wireless devices. Alternatively or in addition, the wireless network may comprise a core network configured to serve the wireless access network and/or to connect the wireless access network with the communications network. The wireless access network may be a radio access network (RAN) or a free-space optical (e.g., infra-red) access network.

The generated IPv6 address may be in the address space of the wireless network as part of the communications network, e.g., as part of the internet. Alternatively or in addition, the generated IPv6 address may be a global address.

The communications network may be a packet data network or a public data network. Alternatively or in addition, the generated IPv6 address may be a public address. Alternatively or in addition, the communications network may be the internet.

Alternatively or in addition, the generated IPv6 address may be a globally routable address, e.g., in the communications network such that any node (e.g., for the application as a cloud service) can send data packets (i.e., one or more messages) to the respective one of the wireless devices. The routing of a data packet in the communications network based on the destination address in the data packet being indicative of the generated IPv6 address may deliver the data packet to the (e.g., to the address at the) NAT entity and/or the gateway.

The generating may comprise generating different IPv6 addresses for different wireless devices among the plurality of wireless devices, e.g. so that a data packet comprising the generated IPv6 address as destination address is delivered (e.g., through the NAT entity and/or the gateway) to the respective one of the wireless devices.

Herein, "at least one" may encompass the two alternatives "one or more", i.e., the two alternatives "one or a plurality of".

At least one or each of the device identifier and the subnet identifier may be an IPv6 address or a part thereof.

The device identifier may be a part of an IPv6 address of the wireless device. Alternatively or in addition, the subnet identifier may be a part of an IPv6 address of the wireless network. The part may be a prefix or a suffix (e.g., an interface identifier) of the respective IPv6 address. For example, the subnet identifier may be a subnet prefix of the wireless network.

The subnet identifier may be a subnet prefix of the wireless network according to IPv6.

The subnet prefix may comprise a predefined number of the most significant bits of an IPv6 address of the wireless network. Alternatively or in addition, the subnet prefix may comprise 64 bits, e.g., the 64 most significant bits, of the IPv6 address of the wireless network.

The device identifier may or may not be an address in an address space of the wireless network. For example, a protocol data unit (PDU) session or a General Packet Radio Service (GPRS) Tunneling Protocol (GTP) tunnel may be established for and/or associated with each of the wireless devices. The device identifier may be an identifier of the PDU session and/or the GTP tunnel of the respective one of the wireless devices.

The device identifier may be uniquely indicative of the respective one of the wireless devices within the wireless network.

Among the plurality of wireless devices or the wireless devices in the wireless network, the device identifier may be uniquely indicative of the respective one of the wireless devices. Alternatively or in addition, the device identifier may be unique within an address space of the wireless network.

The device identifier of the respective one of the wireless devices may be an interface identifier of a link-local address of the respective one of the wireless devices in the wireless network according to IPv6.

The device identifier of the respective one of the wireless devices may be an identifier of a network interface of the respective one of the wireless devices. The wireless devices may be served by the wireless network, e.g., through the network interface of the respective one of the wireless devices.

The device identifier may be, or may correspond to, a medium access control (MAC) address of the respective one of the wireless devices. Alternatively or in addition, the network interface may be a MAC interface.

The method may further comprise a step of assigning, to the respective one or each of the wireless devices, the device identifier of the respective wireless device.

Accordingly, the wireless network (e.g., the gateway) may have knowledge of the device identifier of the respective one or each of the wireless devices. For example, the wireless network (e.g., the gateway) may assign (e.g., suggest) the interface identifier (as an example of the device identifier) of the link-local address of the respective wireless device.

The assigning of the device identifier may be performed prior to the generating of the IPv6 address and/or prior to the providing of the generated IPv6 address. Alternatively or in addition, the device identifier (e.g., the interface identifier of the link-local address of the respective one of the wireless devices) may be provided together with the providing of the generated IPv6 address.

The method may further comprise a step of determining the device identifier for the respective one of the wireless devices or a device identifier for each of the wireless devices. Alternatively or in addition, the method may comprise a step of assigning (e.g., suggesting) to the respective one or each of the wireless devices, the determined device identifier of the respective wireless device. Alternatively or in addition, the method comprises a step of determining the subnet identifier of the wireless network.

The step of determining the device identifier (e.g., interface identifier of the link-local address) or the step of determining the subnet identifier may comprise retrieving the respective identifier from a database, e.g., stored at the gateway and/or the NAT entity and/or the interface device of the wireless network.

The communications network may be a packet data network (PDN).

The generated IPv6 address of the respective one or each of the wireless devices may be unique in an address space of the communications network.

The generated IPv6 address may be uniquely indicative of the respective one of the wireless devices in an address space of the communications network.

Herein, being uniquely indicative may mean that the generated IPv6 address or the device identifier identifies only one of the wireless devices (i.e., one out of the plurality of wireless devices). The respective one of the wireless devices may be associated with at least one IPv6 address and/or at least one device identifier. For example, the respective one of the wireless devices may be further associated with a second IPv6 address.

Alternatively or in addition, the generated IPv6 address may comprise the subnet identifier as a subnet prefix. Alternatively or in addition, the generated IPv6 address may comprise the interface identify of the wireless device.

The generated IPv6 address may comprise a 64-bit prefix and/or a 64-bit suffix. The 64-bit prefix may represent or correspond to the subnet identifier of the wireless network. Alternatively or in addition, the 64-bit suffix may represent or correspond to the device identifier of the respective one of the wireless devices.

The generating of the generated IPv6 address may comprise assigning one 64-bit prefix jointly for all of the plurality of wireless devices. Alternatively or in addition, the generating of the generated IPv6 address may comprise assigning different 64-bit suffixes for different wireless devices in the plurality of wireless devices.

The generating may comprise generating a plurality of IPv6 addresses for the plurality of wireless devices, respectively. Each of the plurality of generated IPv6 addresses may comprise one 64-bit prefix jointly for all of the plurality of wireless devices. Alternatively or in addition, the plurality of generated IPv6 addresses may comprise different 64-bit suffixes for different wireless devices in the plurality of wireless devices.

The assigned 64-bit suffix may be unique for the respective one of the wireless devices. For example, the assigned 64-bit suffix may be an injective function of the device identifier. Alternatively or in addition, the assigned 64-bit suffix may be a hash function of the device identifier.

The generating of the generated IPv6 address may comprise assigning different 64-bit prefixes and different 64-bit suffixes for different wireless devices in the plurality of wireless network.

The generating may comprise generating a plurality of IPv6 addresses for the plurality of wireless devices, respectively. The plurality of generated IPv6 addresses may comprise different 64-bit prefixes for different wireless devices of the plurality of wireless devices. Alternatively or in addition, the plurality of generated IPv6 addresses may comprise different 64-bit suffixes for different wireless devices in the plurality of wireless devices.

Each of the assigned 64-bit prefixes may be unique for the respective one of the different wireless devices. Alternatively or in addition, each of the assigned 64-bit suffixes may be unique for the respective one of the different wireless devices.

The generated IPv6 address of the respective one of the wireless devices may be used only for communicating with the application node. The generated IPv6 address may be different from one or more other IPv6 addresses used by the respective one of the different wireless devices. The one or more other IPv6 addresses may be used for communicating with nodes in the communications network other than the application node. The one or more other IPv6 addresses may be assigned to or used by the respective one of the wireless devices independently of the application node (e.g., for communicating in the communications network independently of, or not involving, the application node).

The generated IPv6 address may comprise a 64-bit prefix assigned to or used by the respective one of the wireless devices independently of the application node. Alternatively or in addition, the generated IPv6 address may comprise a 64-bit suffix assigned to or used by the respective one of the wireless devices exclusively for communicating with the application node.

The wireless device may use the same 64-bit prefix for other applications other than the application of the application node.

Herein, assigning an address or a part of an address (e.g., a prefix or a suffix or an identifier) may comprise sending a configuration message to the respective one of the wireless devices.

The generating of the generated IPv6 address may comprise assigning a sequence number or a random number as a 64-bit suffix of the generated IPv6 address for the respective one of the wireless devices in the wireless network.

The plurality of the wireless devices and/or those of the wireless devices associated with the application node may be (e.g., sequentially) numbered. The sequence number resulting from the numbering may be used for assigning the 64-bit suffix of the generated IPv6 address.

The providing of the generated IPv6 address may comprise updating an interface device, e.g., an API device, of the wireless network for providing the generated IPv6 address to the application node.

The interface device may provide the generated IPv6 address to the application node upon a request from the application node. The interface device may be accessible from (i.e., exposed to) the communications network.

The updating of the interface device may comprise sending an update message to the interface device (e.g., at the database). The interface device (e.g., at the database) may (e.g., responsive to the update message) associate (and/or store an association between) the generated IPv6 address and an identifier used by the application node (e.g., in the request to the interface device) for the respective one of the wireless devices.

The providing of the generated IPv6 address may comprise updating a translation table of a network address translation (NAT) entity of the wireless network according to the generated IPv6 address.

The interface identifier may be assigned by the wireless network for link-local communication and/or provided to the wireless device. Alternatively or in addition, the generated IPv6 address may be provided to the NAT entity and/or (e.g., via the API device) to the application node.

The updating of the interface device may comprise sending an update message to the NAT entity (e.g., at the gateway).

The wireless network may be a 3GPP network. Alternatively or in addition, the wireless network may comprise a RAN and a core network. The NAT entity may be located in the core network.

The NAT entity may be briefly referred to as NAT.

Updating may comprise modifying or adding an entry in the translation table. The entry may be indicative of at least one of the respective one of the wireless devices (e.g., the device identifier) and the generated IPv6 address. Alternatively or in addition, the entry may associate (e.g., be indicative of an association between) the generated IPv6 address and an address in the address space of the wireless network for the respective one of the wireless devices (e.g., the linked-local address or an identifier of a tunnel towards the respective one of the wireless devices). For example, the entry may associate (e.g., be indicative of an association between) the link-local address of the respective one of the wireless devices and the generated IPv6 address of the respective one of the wireless devices.

The NAT entity may be accessible from the communications network using or based on the subnet identifier of the wireless network or using or based on the generated IPv6 address of the respective one of the wireless devices. Alternatively or in addition, a data packet may be routed in the communications network to the NAT entity based on a destination address of the data packet being indicative of the subnet identifier of the wireless network or the generated IPv6 address of the respective one of the wireless devices.

The subnet identifier of an IPv6 address of the NAT entity in the address space of the communications network may be used as the 64-bit prefix of the generated IPv6 address of the respective one of the wireless devices.

The respective one of the wireless devices may be accessible from the communications network through the NAT entity using the generated IPv6 address.

The NAT entity may be located in the wireless network towards the communications network or between the wireless network and the communications network.

The plurality of wireless devices may be internal hosts of the wireless network and/or of the NAT. The NAT and/or the gateway may define whether or not a host is internal or external relative to the wireless network. The wireless devices may be internal in that the wireless devices are reachable from outside of the wireless network only through the NAT and/or the gateway.

The NAT may translate addresses (optionally, and transport protocol ports) only of the internal hosts, hiding towards the communications network an endpoint of the respective wireless device in the wireless network. The transport protocol port may comprise User Datagram Protocol (UDP) ports and/or Transmission Control Protocol (TCP) ports.

The NAT entity may (e.g., may be configured to) translate an incoming data packet from the communications network towards the wireless network using the translation table. For example, the NAT entity may translate the incoming data packet if (e.g., only if) a destination address of the incoming data packet corresponds to the generated IPv6 address (or one of the generated IPv6 addresses). For example, the generated IPv6 address may comprise the subnet identifier as (e.g., 64-bit or subnet) prefix. The subnet identifier may be used as a prefix of an IPv6 address only for communicating with the application node.

The NAT entity may translate an incoming data packet from the communications network towards the wireless network using the translation table. A destination address in the incoming data packet may be indicative of the generated IPv6 address of the respective one of the wireless devices and may be set to the link-local address of the of the respective one of the wireless devices.

A source address of the incoming data packet may be set to a link-local address of the NAT entity, e.g., for a link-local connection between the NAT entity and the gateway. Alternatively, the gateway may comprise the NAT entity and a source address of the incoming data packet may be set to a link-local address of the gateway.

The NAT entity may translate an outgoing data packet from the wireless network towards the communications network using the translation table. A source address in the outgoing data packet corresponds to the link-local address of the of the respective one of the wireless devices and may be set to the generated IPv6 address of the respective one of the wireless devices.

The method may be performed by the NAT entity.

The translating of a data packet by the NAT entity may also be referred to as mapping. The data packet after translation may also be referred to as the mapped data packet.

The method may further comprise a step of sending, from a gateway, a data packet (e.g., on a tunnel) to the respective one of the wireless devices based on an incoming data packet from the communications network. A destination address of the incoming data packet may be indicative of the generated IPv6 address.

The incoming data packet may be received at the gateway before translating (i.e., a network address translation) the incoming data packet from the communications network. A destination address of the incoming data packet at the gateway may be indicative of the generated IPv6 address of the respective one of the wireless devices. Alternatively or in addition, the sending of the data packet on the tunnel may be controlled by the destination address. For example, the gateway may select the tunnel towards the respective one of the wireless devices based on the destination address corresponding to the generated IPv6 address of the respective one of the wireless devices. Furthermore, the gateway may comprise the NAT entity.

Alternatively, the incoming data packet may be received at the gateway after translating (i.e., a network address translation), e.g., performed by the NAT entity, the incoming data packet from the communications network. A destination address of the incoming data packet at the gateway may be indicative of the link-local address of the respective one of the wireless devices. Alternatively or in addition, the sending of the data packet on the tunnel may be controlled by the destination address. For example, the gateway may select the tunnel towards the respective one of the wireless devices based on the destination address corresponding to the link-local address of the respective one of the wireless devices.

The data packet may be sent on the tunnel after translation of the destination address of the incoming data packet, e.g., by the NAT entity. The destination address of the data packet sent on the tunnel to the respective one of the wireless devices may be set to the link-local address of the respective one of the wireless devices or to an IPv6 address in an address space assigned to the respective one of the wireless devices (e.g., according to 3GPP TS 23.221) within the wireless network. The tunnel to the respective one of the wireless devices may be associated exclusively to the respective one of the wireless devices. The tunnel may be identified by a GTP header of a GPRS Tunneling Protocol (GTP).

The method may be performed by the gateway of the wireless network.

A source address of the packet sent from the gateway to the respective one of the wireless devices may be indicative of a link-local address of the gateway in the wireless network.

This may ensure that an outgoing data packet in response to the incoming data packet is sent to the gateway and/or the NAT entity for reversing the translation performed for the incoming data packet. The outgoing data packet in the response sent towards the communications network may be indicative of the generated IPv6 address as the source address and/or the IPv6 address of the application node as the destination address.

The gateway may be located at the wireless network towards the communications network or between the communications network and the wireless network or between the NAT entity and the wireless network.

The tunnel may comprise or use at least one of: a GPRS Tunneling Protocol for a user plane (GTP-U); a next generation user plane (NG-U); a packet data protocol (PDP) context between the gateway and the respective one of the wireless devices; a protocol data unit (PDU) session between the gateway and the respective one of the wireless devices; and a link-local communication between the gateway and the respective one of the wireless devices.

The tunnel between the gateway and a wireless access network of the wireless network may use or may be associated with a data radio bearer (DRB) between the wireless access network and the respective one of the wireless devices.

The tunnel may be associated with the DRB according to at least one of: a PDP context between the gateway and the respective one of the wireless devices; a PDU session between the gateway and the respective one of the wireless devices; and a link-local communication between the gateway and the respective one of the wireless devices.

The tunnel and/or the PDU session may be associated with the respective one of the wireless devices.

The gateway may be or may comprise at least one of: a gateway GPRS support node (GGSN) of the wireless network; a PDN gateway of the wireless network; a PDN gateway for a user plane of the wireless network; and a user plane function, UPF, of the wireless network.

The PDN gateway may be referred to as PDN-GW or P-GW. The PDN gateway for the user plane may be referred to as P-GW-U.

The core network may comprise at least one of the NAT entity and the gateway.

As per subclause 9.2.1.1 of the 3GPP document TS 23.060, version 16.0.0 and subclause 5.3.1.2.2 of the 3GPP document TS 23.401, version 17.1.0, the wireless device may use an interface identifier received (e.g., suggested) from the gateway to configure its link-local address.

Alternatively or in addition, e.g., for privacy, the wireless device may choose any interface identifier to generate its one or more IPv6 addresses other than link-local address and/or without involving the wireless network. For example, for communicating with the application node through the NAT entity, the wireless device may use its link-local address. Alternatively or in addition, the wireless device may use its one or more IPv6 addresses other than link-local address for communicating with a node in the wireless network other than the application node.

The wireless device may generate its full IPv6 address in the address space of the wireless network as defined in the 3GPP document TS 23.221, version 16.2.0, e.g., without involving the wireless network. For example, the gateway and/or the NAT entity is not updated with the one or more IPv6 address generated by the wireless device (i.e., its one or more IPv6 addresses), e.g., since a prefix of the IPv6 address generated by the wireless device identifies the tunnel to the wireless device (e.g., according to the PDP context).

The gateway may comprise the NAT entity.

As to a second method aspect, a method of providing an internet protocol (IP) address according to IP version 6 (IPv6) to an application node in a communications network is provided. The method comprises a step of receiving an update message from a wireless network, the update message being indicative of an IPv6 address generated for access from the application node in the communications network to one of a plurality of wireless devices connected or connectable to the wireless network. The method further comprises a step of sending, in response to a request received from the application node, the generated IPv6 address to the application node.

The request may comprise at least one of: an international mobile subscriber identity (IMSI) of the respective one of the wireless devices; an application-specific device identifier used by the application node for the respective one of the wireless devices; a mobile station integrated services digital network number (MSISDN) of the respective one of the wireless devices; and an international mobile station equipment identity (IMEI) of the respective one of the wireless devices. Alternatively or in addition, the request may be (e.g., uniquely) indicative of the respective one of the wireless devices, optionally using at least one of the IMSI; the application-specific device identifier used by the application node; the MSISDN; and the IMEI.

The request may be indicative of the application node. The application node may be associated with a batch of IMSIs, application-specific device identifiers (MSISDNs), or IMEIs of a subset of the plurality of wireless devices. The update message may be indicative of the generated IPv6 addresses for the access to the respective wireless devices. The sending may comprise sending the generated IPv6 addresses of the subset to the application node.

The batch of IMSIs, application-specific device identifiers, MSISDNs, or IMEIs may be stored at the interface device (e.g., in the database).

The interface device may provide the generated IPv6 address to the application node upon a request from the application node. The interface device (e.g., the database) may perform the method.

The second method aspect may be performed by an interface device, e.g., an application programming interface (API) device, of the wireless network. The interface device may be an API device configured to provide an API providing the generated IPv6 address to the application node upon request.

The second method aspect may further comprise any feature and/or any step disclosed in the context of the first method aspect, or a feature and/or step corresponding thereto, e.g., a receiver counterpart to a transmitter feature or step.

The technique may be applied in the context of 3GPP New Radio (NR) or 3GPP Long Term Evolution (LTE) as radio access technology (RAT).

Any wireless device may be a radio device or a user equipment (UE), e.g., according to a 3GPP specification.

The wireless devices and/or the wireless access network (e.g., a radio access network or RAN) may form, or may be part of, the wireless network (e.g., a radio network), e.g., according to the Third Generation Partnership Project (3GPP) or according to the standard family IEEE 802.11 (Wi-Fi).

The first method aspect and the second method aspect may be performed by one or more embodiments of the gateway and the interface device, respectively.

The RAN may comprise one or more base stations. Alternatively or in addition, the radio network may be a vehicular, ad hoc and/or mesh network comprising two or more radio devices, e.g., acting as the remote radio device and/or the relay radio device and/or the further remote radio device.

Any of the wireless devices (e.g., radio devices) may be a 3GPP user equipment (UE) or a Wi-Fi station (STA). The radio device may be a mobile or portable station, a device for machine-type communication (MTC), a device for narrowband Internet of Things (NB-IoT) or a combination thereof. Examples for the UE and the mobile station include a mobile phone, a tablet computer and a self-driving vehicle. Examples for the portable station include a laptop computer and a television set. Examples for the MTC device or the NB-IoT device include robots, sensors and/or actuators, e.g., in manufacturing, automotive communication and home automation. The MTC device or the NB-IoT device may be implemented in a manufacturing plant, household appliances and consumer electronics.

Whenever referring to the RAN, the RAN may be implemented by one or more base stations.

The wireless device may be wirelessly connected or connectable (e.g., according to a radio resource control, RRC, state or active mode) with the wireless network (e.g., with the RAN of the wireless network).

The base station may encompass any station that is configured to provide wireless (e.g., radio) access to any of the wireless devices. The base stations may also be referred to as cell, transmission and reception point (TRP), radio access node or access point (AP). The base station may provide a data link to a host computer (e.g., the application node) providing the user data to the wireless devices or gathering user data from the wireless devices.

Examples for the base stations may include a 3G base station or Node B (NB), 4G base station or eNodeB (eNB), a 5G base station or gNodeB (gNB), a Wi-Fi AP and a network controller (e.g., according to Bluetooth, ZigBee or Z-Wave).

The RAN may be implemented according to the Global System for Mobile Communications (GSM), the Universal Mobile Telecommunications System (UMTS), 3GPP Long Term Evolution (LTE) and/or 3GPP New Radio (NR).

Any aspect of the technique may be implemented on a Physical Layer (PHY), a Medium Access Control (MAC) layer, a Radio Link Control (RLC) layer, a packet data convergence protocol (PDCP) layer, a Radio Resource Control (RRC) layer of a protocol stack for the radio communication, an internet layer, a transport layer, a GPRS tunneling layer, and/or a protocol data unit (PDU) layer.

Herein, referring to a protocol of a layer may also refer to the corresponding layer in the protocol stack. Vice versa, referring to a layer of the protocol stack may also refer to the corresponding protocol of the layer. Any protocol may be implemented by a corresponding method.

As to another aspect, a computer program product is provided. The computer program product comprises program code portions for performing any one of the steps of the first method aspect and/or the second method aspect disclosed herein when the computer program product is executed by one or more computing devices. The computer program product may be stored on a computer-readable recording medium. The computer program product may also be provided for download, e.g., via the radio network, the RAN, the Internet and/or the host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a first device aspect, a generator device is provided.

The first device aspect may comprise a generator device for generating an internet protocol, IP, address according to IP version 6, IPv6, for access to one of a plurality of wireless devices connected or connectable to a wireless network from an application node in a communications network. The generator device comprises processing circuitry operative to cause the generator device to generate an IPv6 address for access from the application node in the communications network to a respective one of the wireless devices, wherein the IPv6 address is generated based on a subnet identifier of the wireless network and a device identifier of the respective one of the wireless devices; and to provide the generated IPv6 address for the access from the application node in the communications network.

The processing circuitry of the generator device may be further operable to perform any step of the first method aspect.

Alternatively or in addition, the first device aspect may comprise a generator device for generating an internet protocol, IP, address according to IP version 6, IPv6, for access to one of a plurality of wireless devices connected or connectable to a wireless network from an application node in a communications network. The generator device is configured to generate an IPv6 address for access from the application node in the communications network to a respective one of the wireless devices, wherein the IPv6 address is generated based on a subnet identifier of the wireless network and a device identifier of the respective one of the wireless devices; and to provide the generated IPv6 address for the access from the application node in the communications network.

The generator device may be further configured to perform any step of the first method aspect.

As to a second device aspect, an interface device is provided.

The second device aspect may comprise an interface device for providing an internet protocol, IP, address according to IP version 6, IPv6, to an application node in a communications network. The interface device comprising memory operable to store instructions and processing circuitry operable to execute the instructions, such that the interface device is operable to receive an update message from a wireless network, the update message being indicative of an IPv6 address generated for access from the application node in the communications network to one of a plurality of wireless devices connected or connectable to the wireless network; and to send, in response to a request received from the application node, the generated IPv6 address to the application node.

The interface device may be further operable to perform any step of the second method aspect.

Alternatively or in addition, the second device aspect comprises an interface device for providing an internet protocol, IP, address according to IP version 6, IPv6, to an application node in a communications network. The interface device is configured to receive an update message from a wireless network, the update message being indicative of an IPv6 address generated for access from the application node in the communications network to one of a plurality of wireless devices connected or connectable to the wireless network; and to send, in response to a request received from the application node, the generated IPv6 address to the application node.

The interface device may be further configured to perform any step of the second method aspect.

The interface device may be an application programming interface (API) device. The interface device may provide an API to the application node. Therefore, the interface device may also be referred to as the API device.

As to a still further aspect, a communication system is provided. The communication system comprises a host computer. The host computer comprises processing circuitry configured to provide user data and a communication interface configured to forward user data to a radio network for transmission to a user equipment (UE), wherein the cellular radio network comprises a radio interface and processing circuitry configured to execute any of the steps of the first method aspect and/or any of the steps of the second method aspect.

The communication system may further include at least one of the UE and the radio network.

The radio network may comprise a generator device according to the first device aspect. Alternatively or in addition, the radio network may comprise an interface device according to the second device aspect.

The processing circuitry of the host computer may be configured to execute a host application, thereby providing the user data. A processing circuitry of the UE may be configured to execute a client application associated with the host application.

The host computer may be an application node associated with the UE.

Any one of the devices, the UE, the base station, the generator device, the gateway, the NAT entity, the interface device, the database, the communication system or any node or station for embodying the technique may further include any feature disclosed in the context of the method aspect, and vice versa. Particularly, any one of the units and modules disclosed herein may be configured to perform or initiate one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a New Radio (NR) or 5G implementation, it is readily apparent that the technique described herein may also be implemented for any other radio communication technique, including a Wireless Local Area Network (WLAN) implementation according to the standard family IEEE 802.11, 3GPP LTE (e.g., LTE-Advanced or a related radio access technique such as Multe-Fire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
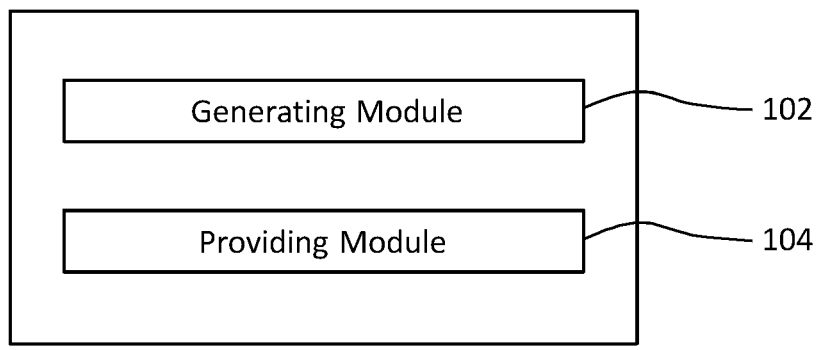
FIG. 1 shows a schematic block diagram of an embodiment of a device for generating an IPv6 address for access to a wireless device.

FIG. 1 schematically illustrates a block diagram of an embodiment of a device for generating an IP address according to IP version 6 (briefly: IPv6 address) for access to one of a plurality of wireless devices. The device is generically referred to by reference sign 100.

The wireless devices are connected or connectable to a wireless network. The wireless devices are accessed from an application node in a communications network.

The device 100 comprises a generating module 102 that generates an IPv6 address for access from the communications network to a respective one of the wireless devices, wherein the IPv6 address is generated based on a subnet identifier of the wireless network and a device identifier of the respective one of the wireless devices.

The device 100 further comprises a providing module 104 that provides the generated IPv6 address for the access by the application node in the communications network.

Any of the modules of the device 100 may be implemented by units configured to provide the corresponding functionality.

The device 100 may also be referred to as, or may be embodied by, a generator device (or briefly: generator). The generator device 100 and an interface device (e.g., an API device) may be in communication, e.g., at least for the providing of the generated IPv6 address from the generator device 100 to the interface device. The interface device may be embodied by the device 200.

Figure 2:
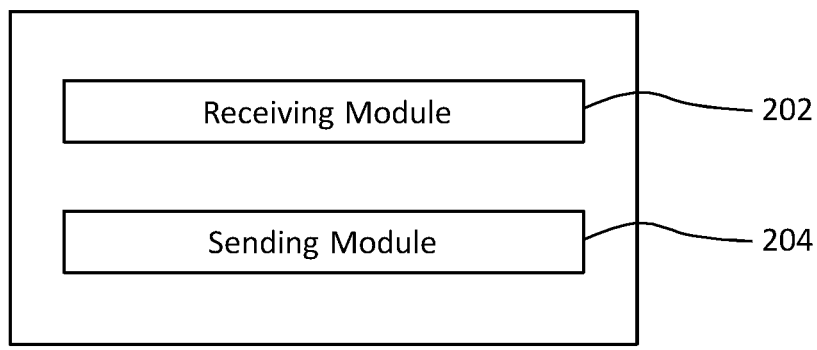
FIG. 2 shows a schematic block diagram of an embodiment of a device for providing an IPv6 address to an application node in a communications network.

FIG. 2 schematically illustrates a block diagram of an embodiment of a device for providing an IPv6 address to an application node in a communications network. The device is generically referred to by reference sign 200.

The device 200 comprises a receiving module 202 that receives an update message from a wireless network, the update message being indicative of an IPv6 address generated for access from the communications network to one of a plurality of wireless devices connected or connectable to the wireless network. The device 200 further comprise a sending module 204 that sends, in response to a request received from the application node, the generated IPv6 address to the application node.

Any of the modules of the device 200 may be implemented by units configured to provide the corresponding functionality.

The device 200 may also be referred to as, or may be embodied by, an interface device 200 (e.g., an Application Programming Interface device or briefly: API). The application node and the interface device 200 may be in communication, e.g., at least for receiving the request from the application node and/or for sending 404 the generated IPv6 address to the application node.

The update message may be received from the generator device 100. E.g., the generator device 100 may provide the generated IPv6 address in the update message to the interface device 200.

Figure 3:
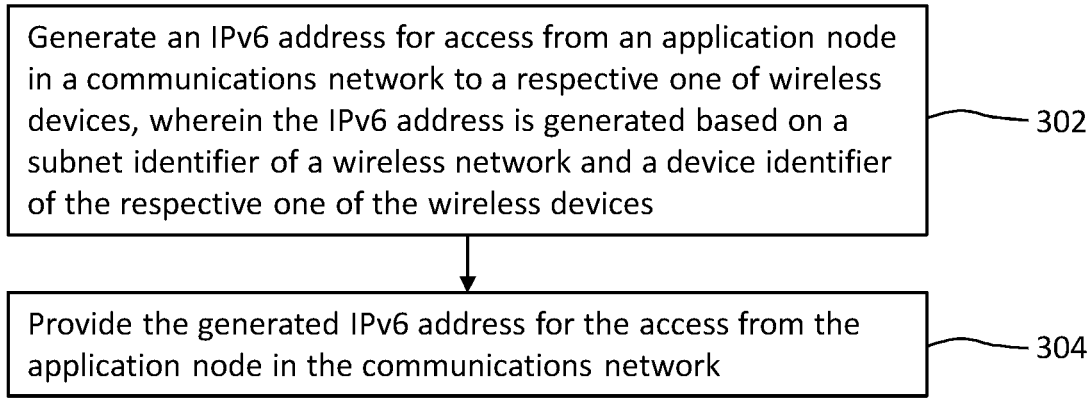
FIG. 3 shows a flowchart for a method of generating an IPv6 address for access to a wireless device, which method may be implementable by the device of FIG. 1.

FIG. 3 shows an example flowchart for a method 300 of generating an IPv6 address for access to one of a plurality of wireless devices connected or connectable to a wireless network from an application node in a communications network.

In a step 302, an IPv6 address for access from the communications network to a respective one of the wireless devices is generated, wherein the generated IPv6 address is generated based on a subnet identifier of the wireless network and a device identifier of the respective one of the wireless devices. In a step 304, the generated IPv6 address is provided for the access by (i.e., from) the application node in the communications network.

The method 300 may be performed by the device 100. For example, the modules 102 and 104 may perform the steps 302 and 304, respectively.

Figure 4:
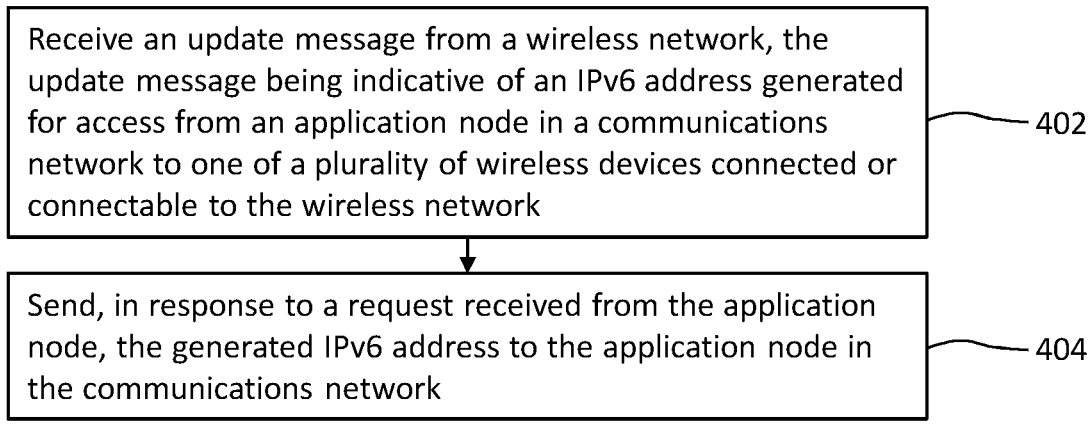
FIG. 4 shows a flowchart for a method of providing an IPv6 address to an application node in a communications network, which method may be implementable by the device of FIG. 2.

FIG. 4 shows an example flowchart for a method 400 of providing an IPv6 address to an application node in a communications network.

In a step 402, an update message is received from a wireless network. The update message is indicative of an IPv6 address generated for access from the communications network to one of a plurality of wireless devices connected or connectable to the wireless network. In a step 404, the generated IPv6 address is sent to the application node in response to a request received from the application node.

The method 400 may be performed by the device 200. For example, the modules 202 and 204 may perform the steps 402 and 404, respectively.

In any aspect, the generating 302 may comprise sending and/or allocating (or assigning) the generated IPv6 address to the respective one of the wireless devices.

In any aspect or any embodiment, the generated IPv6 address may be generated based on the subnet identifier and the device identifier according to an implementation in the gateway and/or the NAT entity (e.g., a NAT66). For example, the 64-bit prefix of the generated IPv6 address may be an (e.g., injective) function of the subnet identifier or a function of the subnet identifier and the device identifier. Alternatively or in addition, the 64-bit suffix of the generated IPv6 address may be an (e.g., injective) function of the device identifier or a function of the subnet identifier and the device identifier.

The generating 302 may be implemented in accordance with at least one of the following examples.

As a first example, the gateway and/or the NAT entity may determine (e.g., choose) one 64-bit prefix jointly for all wireless devices and then generate IPv6 addresses within that address space (i.e., the address space defined by the chosen 64-bit prefix), wherein the generated IPv6 address comprises a different 64-bit suffix for different wireless devices.

As a second example, the gateway and/or the NAT may allocate (i.e., assign) one 64-bit prefix and one IPv6 address within the address space defined by the one 64-bit prefix for each of the wireless devices. Since the wireless device already has one 64-bit prefix for regular data traffic (e.g., for communicating with the communications network not involving the application node), the second example may consume twice as much address space compared to a conventional address allocation without the technique.

As a third example, the generated IPv6 address of the respective one of the wireless devices (e.g., the generated IPv6 address used by the gateway and/or the NAT) may be one IPv6 address from address space defined by a 64-bit prefix already allocated for (i.e., assigned to) the respective one of the wireless devices.

The third example may run the risk of a collision (albeit very small, with one out of 2^64 addresses to use), as the wireless devices are (e.g., according to a technical specification of 3GPP) not required to perform Duplicate Address Detection (DAD) on a mobile link. The probability for the wireless device and the gateway could generating (i.e., allocating) the same IPv6 address is only 1 to 2^64.

In any aspect or any embodiment, the generating 302 may comprise determining (e.g., allocate and/or assign) a 64-suffix of the generated IPv6 address (i.e., an interface identifier of the generated IPv6 address). The 64-bit suffix may be determined according to at least one of the following examples.

As a fourth example, the 64-bit suffix may be a sequence number (e.g., a serial number). The generating 302 according to the fourth example is also referred to as a sequential selection. For example, the 64-bit suffix of the generated IPv6 addresses may be 1, 2, 3, etc. for the first, second, third etc. of the wireless devices that needs a service of the application node or is associated with the application node. The fourth example can be readily implemented and can protect the interface identifiers of the link-local addresses of the wireless devices.

In a fifth example, the 64-bit suffix may be a (e.g., pseudo) random number. The generating 302 according to the fifth example is also referred to as a random selection. In a first variant of the fifth example, the generating 302 comprises generating a random number for the 64-bit suffix (e.g., without collision check). A collision without the collision check is unlikely. In a second variant of the fifth example, the generating 302 comprises generating a random number for the 64-bit suffix with a collision check. For example, the generating of a random number for the 64-bit suffix is repeated if the 64-bit suffix is already assigned (i.e., allocated), e.g., to another one of the wireless devices. Performing the collision check is inexpensive (in terms of network resources or computation resources), e.g. because the gateway or the NAT entity knows all the generated IPv6 addresses it has already generated (e.g., allocated or assigned) according to the fifth generating example.

In a sixth example, the 64-bit suffix of the generated IPv6 address is based on the device identifier and/or any information of the respective one of the wireless devices. The generating 302 according to the sixth example is also referred to as a functional selection or an algorithmic selection.

For example, the device identifier may be the IMSI. The 64-bit suffix (i.e., the interface identifier) of the generated IPv6 address may be a function of the IMSI:

interface identifier of the generated IPv6 address=h (IMSI).

The sixth example may be implemented with or without a collision check.

For example, the database and/or the interface device may know the device identifiers (e.g., IMSIs) of the wireless devices. The database and/or the interface device 200 may also perform the generating 302, e.g. in addition to and/or independently of the gateway and/or the NAT entity performing the generating 302. Since the generating 302 is deterministic, e.g. by calculating the generated IPv6 address, the database and/or the interface device 200 may automatically determine the generated IPv6 address of the respective one of the wireless devices using the same algorithm used by the gateway and/or the NAT entity. For example, the generated IPv6 address does not need to be provided from the gateway and/or the NAT entity to the database and/or the interface device. Alternatively or in addition, the generated IPv6 address does not need to be stored at the database and/or the interface device.

As a seventh example, the 64-bit suffix of the generated IPv6 address is the device identifier, e.g. the interface identifier, assigned (e.g., suggested or sent) to the respective one of the wireless devices for the link-local address. An implementation (e.g., at the gateway) of the assigning of the device identifier, e.g. the interface identifier, of the link-local address may assign a unique identifier to each of the wireless devices (e.g., as opposed to a fixed value, such as 1, assigned to multiple wireless devices). The seventh example may potentially reveal the link-local identifier in the communications network, e.g., to an outside party or to the application node.

As an eighth example, the generated IPv6 address may be based on the link-local address or the 64-bit suffix assigned (e.g., communicated to) the respective one of the wireless devices for the link-local address. The eighth example is an example of an algorithmic selection.

Optionally, the generating 302 may combine at least one of the first to third examples with at least one of the fourth to eighth generating examples.

In any aspect, the connection between the wireless device 510 and a radio access network (RAN) 520 of the wireless network 502 may comprise an uplink (UL) and a downlink (DL), and optionally, one or more direct wireless connections between wireless devices, e.g., device-to-device (D2D) communications or sidelink (SL) communications, acting as a relay between the wireless device 510 and the RAN 520.

Each of the generator device 100 and interface device 200 may be, or may be embodied by, a node of the wireless network 502 or a functional entity in a node of the wireless network 502.

Herein, any wireless device 510 may be a radio device, e.g., a mobile or portable station and/or any radio device wirelessly connectable to a base station of the RAN 520, or to a relay radio device. For example, the radio device 510 may be a user equipment (UE), a device for machine-type communication (MTC) or a device for (e.g., narrowband) Internet of Things (IoT). Two or more radio devices may be configured to wirelessly connect to each other, e.g., in an ad hoc radio network or via a 3GPP SL connection. Furthermore, any base station may be a station providing radio access, may be part of the RAN 520 and/or may be a node connected to the RAN for controlling the radio access. For example, the base station may be an access point, for example a Wi-Fi access point.

Figure 5:
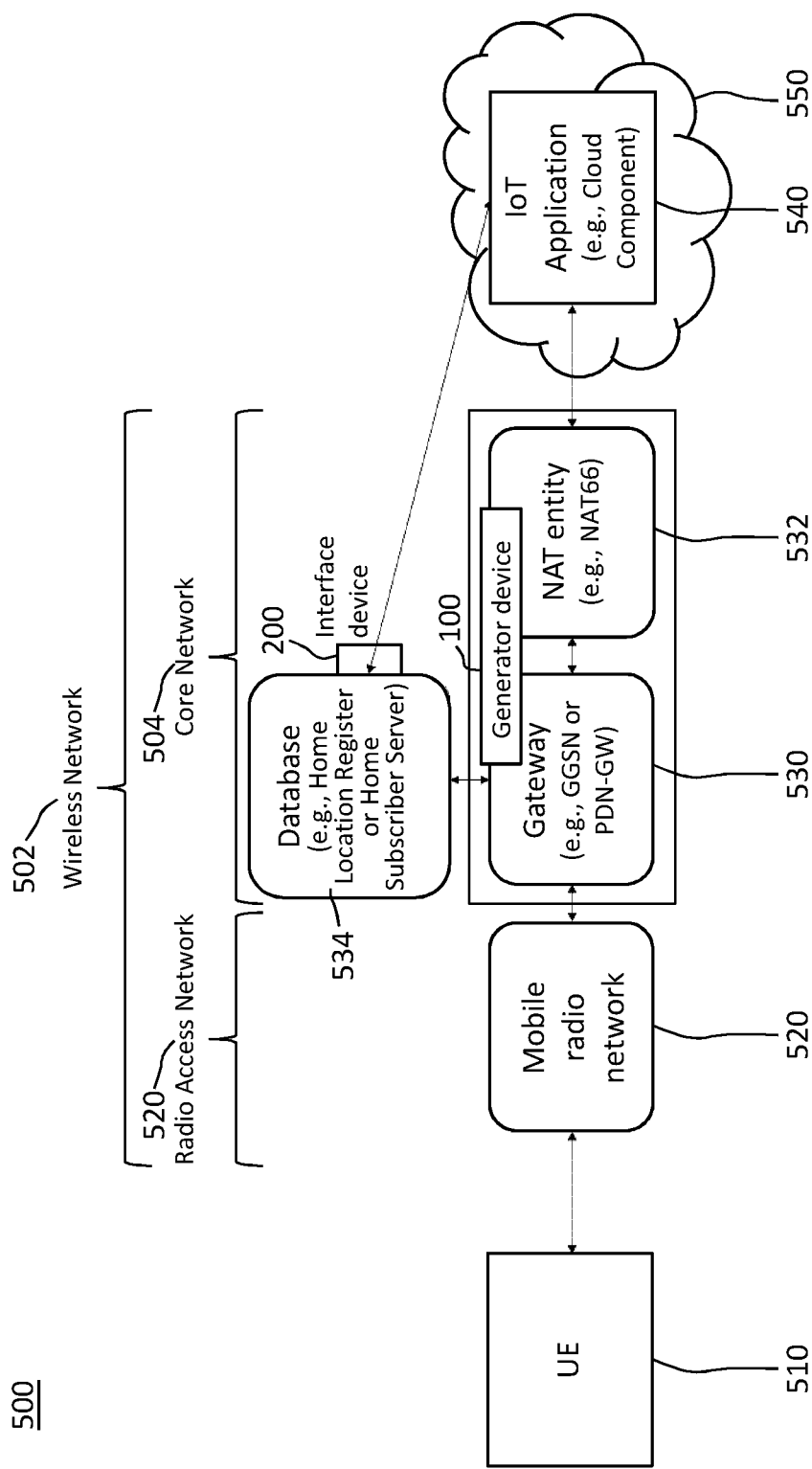
FIG. 5 shows a schematic block diagram of a first example of a communications system comprising embodiments of the devices of FIGS. 1 and 2 performing the methods of FIGS. 3 and 4, respectively.

FIG. 5 schematically illustrates an exemplary communications system 500 comprising an embodiment of the respective one of the wireless devices 510, an embodiment of the wireless network 502 serving the wireless devices 510, and an embodiment of the application node 540 in the communications network 550. The wireless network 502 may comprise a radio access network 520 (RAN, e.g., a mobile or cellular radio network) and a core network 504 that connects the RAN 520 and the communications network 550.

The application node 540 may be a cloud part of an application used and/or supported by the respective one of the wireless devices 510 or each of the plurality of wireless devices 510.

The core network 504 may comprise a gateway 530 and a network address translation (NAT) entity 532. The NAT entity 532 may be embodied by the gateway 530, e.g., the NAT entity 532 may be a functional entity of the gateway 530. Furthermore, the core network 504 may comprise a database 534, e.g., a Home Subscriber Server (HSS) or a Home Location Register (HLR) or a User Profile Server Function (UPSF). The database 534 may store at least one of the subnet identifier and the device identifier for each of the wireless devices 510. The database 534 may be embodied by the gateway 530, e.g., the database 534 may be a functional entity of the gateway 530.

The technique may be implemented for and/or in the wireless network 502. The technique can provide wireless connectivity to the wireless devices according to IPv6, e.g., in an IPv6 IoT deployment, as an example of the communications system 500 schematically illustrated in FIG. 5.

The generator device 100 may be embodied by the gateway 530 and/or the NAT entity 532. Alternatively or in addition, the interface device 200 may be embodied by the gateway 530 or a database 534, e.g., a Home Subscriber Server (HSS) or a Home Location Register (HLR).

The wireless devices 510 are assigned link-local addresses according to IPv6, e.g., by the gateway 530 or the database 534. The wireless network 502, e.g., the database 534 and/or the gateway 530, maintains internal knowledge of these address assignments.

Through the interface device 200, the application node 540 can query the generated IPv6 address of the respective one of the wireless devices 510. The generated IPv6 address may be a global address that is assigned to the respective one of the wireless devices 510 for the access from the communications network 550.

The core network 504 (e.g., the generator device 100 and/or the interface device 200) may have knowledge of the generated IPv6 address. The application node 540 may be provided with the generated IPv6 address according to the step 404. The respective one of the wireless devices 510 may have no knowledge of the generated IPv6 address and/or may not use the generated IPv6 address for the purpose of sending IP packets to or receiving IP packets from the application node 540 (i.e., for the traffic with the application node 540).

While FIG. 5 schematically illustrates the communications system 500 for one of the wireless devices 510 and for one application node 540, the technique may generate 302 and provide 304 an IPv6 address for each wireless device in the plurality of wireless devices 510 associated with one or more application nodes 540. Different application nodes may correspond to different applications (e.g., services). Alternatively or in addition, different application nodes may be associated with different subsets of the wireless devices 510 served by, and/or connected or connectable to, the wireless network 502.

The interface device 200 may provide, to one of the application nodes 540, the generated IPv6 addresses of only those wireless devices 510 associated with the one of the application nodes. Alternatively or in addition, two different IPv6 addresses may be generated for one of the wireless devices 510, if or wherein the respective one of the wireless devices 510 is associated with two different application nodes 540. The interface device 200 may provide only the respective one of the two generated IPv6 addresses to the respective one of the two different application nodes 540 according to the association.

Upon receiving the generated IPv6 address according to the step 404, the application node 540 can communicate with the respective one of the wireless devices 510, e.g., even if the respective one of the wireless devices 510 would otherwise not have a reason to communicate. This functionality may also be referred to as "tap on shoulder", i.e., an ability of the application node 540 to request the respective one of the wireless devices 510 to perform an action or to get back to the application node 540 so that an action can be performed.

The technique can enable the access from the communications network 550 to the respective one of the wireless devices 510 or each of the wireless devices 510, even if the wireless network 502 is not aware of the IPv6 addresses assigned to or used by the respective one of the wireless devices 510. In the IPv6 domain of the communications network 550, the wireless network 502 may be only aware of the subnet prefix as a 64-bit prefix and the device identifier equal to or associated with an interface identifier for a link-local communication of the respective one of the wireless devices 510 in the wireless network 502, e.g., between the gateway 530 and the respective one of the wireless devices 510.

In at least some embodiments, the wireless network 502 has no knowledge of which actual interface identifiers are used with a global prefix or in an IPv6 address by the respective one of the wireless devices 510. In same or further embodiments, the application node 540 can send one or more (e.g., data or control) packets (e.g., "tap on shoulder" packets) to the respective one or each of the wireless devices associated with the application node 540.

The technique may prevent that a communication model has to be changed to e.g., a communication initiated by the wireless devices 510. Hence, the communication between the application node 540 and the plurality of wireless devices 510 associated with the application node 540 may be simplified and/or signaling overhead may be reduced. Alternatively or in addition, the wireless network 502 may (e.g., by virtue of its interface device 200) be in control of the distribution of the generated IPv6 addresses for the access to the respective wireless devices 510. For example, the wireless network 504 may selectively restrict the access by sending 404 the generated IPv6 address that is valid for a predefined time period. The access may be interrupted by eliminating the generated IPv6 address from the translation table of the NAT entity 532 or re-generating a different IPv6 address for the respective one of the wireless devices 510 (e.g., upon expiry of a timer indicative of the validity of the generated IPv6 address).

Alternatively or in addition, the technique may prevent that data packets sent from the respective one of the wireless devices 510 have to be monitored (i.e., inspected) and recorded as to (e.g., source) addresses most recently used by the respective one of the wireless devices 510.

Alternatively or in addition, the technique may prevent that the connection between the respective one of the wireless devices 510 and the application node 540 has to establish and maintain an L2 tunnel (e.g., a VPN tunnel), which can reduce power consumption and complexity of the wireless devices 510 (e.g., IoT devices).

Any embodiment of the generator device 100 may use the link-local address of the respective one of the wireless devices 510 in the wireless network 502 for the generating 302, and/or the NAT entity 532 (e.g., an IPv6-to-IPv6 NAT, or briefly, NAT66) between the wireless network 502 and the communications network 550 (e.g., at the gateway 530) for the providing 304. The link-local address is always known (e.g., at the database 534 or the gateway 530), as link-local address uses (i.e., is derived from) the interface identifier suggested by the wireless network 502 (e.g., by the database 534 or the gateway 530).

The providing 304 of the generated IPv6 address may comprise transmitting an update message. The update message (e.g., an IoT application information) is indicative of the generated IPv6 address.

The update message may be provided to the NAT entity 532. Responsive to the update message, the generated IPv6 address may be entered in the translation table of the NAT entity 532. Alternatively or in addition, the update message may be provided to the application node 540. I.e., the update may be received 402 by the interface device 200. The interface device 200 may send 404 the generated IPv6 address to the application node 540 (e.g., responsive to the update message or upon request by the application node 540), so that the application node 540 can use the generated IPv6 address to reach the respective one of the wireless devices 510.

To this end, the wireless network 502 (e.g., the NAT entity 532 or the gateway 530 using the translation table) can map the generated IPv6 address to the link-local communication between the gateway 530 and the wireless device 510. For example, the destination address in an IP packet received from the communications network 550 is set to the link-local address of the respective one of the wireless devices 510.

Figure 6:
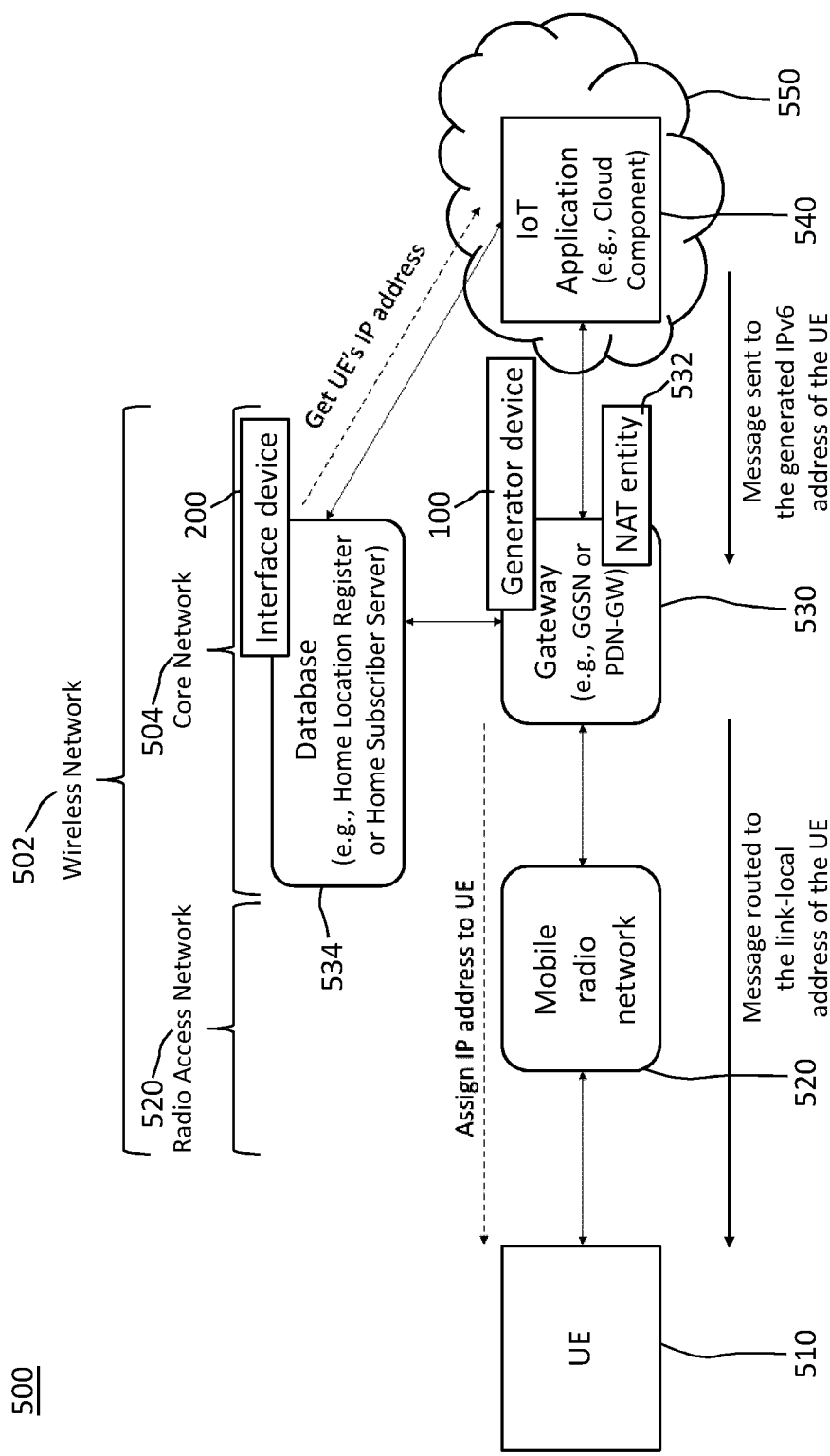
FIG. 6 shows a schematic block diagram of a second example of a communications system comprising embodiments of the devices of FIGS. 1 and 2 performing the methods of FIGS. 3 and 4, respectively.

FIG. 6 schematically illustrates a further example of a communications system 500 comprising embodiments of the technique. Reference signs equal to those of FIG. 5 may indicate equal or functionally equivalent features. The embodiments of FIG. 6 may be realized individually, in combination, and/or as an extension of the embodiments of FIG. 5.

The wireless network 502 may have one or more interface devices 200 (e.g., APIs) configured to provide information of the wireless network 502 in the communications network 550 according to the step 404, e.g., upon request. For instance, the application node 540 for an IoT application may request (i.e., query or ask) the interface device 200 about a status of the wireless devices 510 associated with the application node 540, e.g., what IPv6 addresses they are at, i.e., which IPv6 addresses are to be used for the access to the wireless devices 510. The interface device 200 responds to the request according to the step 404, e.g., with a message that is indicative of the generated IPv6 address.

The interface device 200 may send 404 generated IPv6 addresses in batches. For example, the interface device 200 may send 404 the generated IPv6 addresses for all wireless devices 510 associated with the requesting application node 540 in a batch.

Such requests (i.e., queries) may be based on an access account of the application node 540 at the wireless network 502. The account may be stored in the database 534 or the interface device 200. The account may comprise a certificate for authenticating the application node 540 in the request. Alternatively or in addition, the generated IPv6 addresses sent in the step 404 may be limited to the generated IPv6 addresses of the wireless devices 510 associated with the application node 540. It would not be possible to query data about other wireless devices connected to and/or served by the wireless network 502.

Any embodiment of the technique may use at least one of the following components.

A first component comprises at least on wireless device 510. An IPv6 operation of the at least one wireless device 510 may be unchanged, e.g., according to current standards.

A second component comprises a (e.g., radio or optical) interface between the at least one wireless device 510 and the wireless network 502. The interface may be unchanged from current standards. The interface identifier may be an identifier of the interface between the respective one of the wireless devices 510 and the wireless network 502.

A third component comprises the wireless network 502. The wireless network 502 may comprise the RAN 520 (e.g., a mobile radio network) and a core network 504 associated with the RAN 520. The core network 504 may comprise one or more gateways 530, e.g., a gateway GPRS support node (GGSN) or a PDN gateway (PDN-GW) associated with the RAN 520.

A fourth component comprises memory in the wireless network 502. The wireless network 502 needs to remember which device identifier (e.g., interface identifier) it provided to the respective one of the wireless devices 510. E.g., the wireless network 502 comprises a database 534 (e.g., a database node or a database functional entity) and/or the gateway 530, which knows about currently connected wireless devices 510 and their addressing status (e.g., the generated IPv6 address of the respective one of the wireless devices 510).

A fifth component, which may coincide with (e.g., may be implemented together with) the fourth component, comprises an interface device 200 (e.g., an exposure API of the database 534) that allows the wireless network 502 to inform (e.g., in the step 304) the (e.g., IoT) application node 540 of at least one of: Firstly, the wireless network 502 (e.g., the interface device 200) informs that the wireless network 502 has a capability to reach the at least one wireless device 510 according to IPv6, i.e., based on the at least one generated IPv6 address. Secondly, the wireless network 502 (e.g., the interface device 200) sends 304 the generated IPv6 address (e.g., the subnet prefix and the interface identifier as the device identifier) for the access to (i.e., to reach) the respective one of the wireless devices 510. Optionally, the interface device 200 sends or receives a control message for setting an operation mode of the wireless network 502. The operation mode may be set to apply the technique, i.e., to provide 304 the generated IPv6 address (also referred to as the technique being turned on), or to not apply the technique (also referred to the technique being turned off).

A sixth component comprises a NAT entity 532, e.g., for NAT66 functionality. The NAT entity 532 may be implemented in the gateway 530 (e.g., as a functional entity of the gateway 530) or between the gateway 530 and the application node 540, i.e., gateway 530 and the communications network 550.

The NAT entity 532 or the gateway 530 may be configured to map (e.g., control or data) packets sent from the communications network 550 outside of the wireless network 502 (e.g., from the application node 540) to the generated IPv6 address (i.e., generated IPv6 address sent from the interface device 200 according to the step 404) to a link-local communication (e.g., between the gateway 530 and the respective one of the wireless devices 510). For instance, if the generated IPv6 address sent from (i.e., indicated by) the interface device 200 is A for the respective one of the wireless devices 510, the mapped link-local address of the respective one of the wireless devices 510 may be a (e.g., standardized) IPv6 link-local prefix followed by the interface identifier determined (e.g., collected) by the gateway 530 earlier. The mapped link-local address of the respective one of the wireless devices 510 may be used as the destination address (e.g., within the wireless network 502). The source address can be, for instance, the link local address of the gateway, or some different link local address used for this purpose.

Optionally, the NAT entity 532 or the gateway 530 stores (i.e., records) at least one or each of: a source address of the packet as sent into the wireless network 502, i.e., a router-side source address; and a source address of the packet received from the communications network 550, i.e., the source address when the packet was sent from the outside of the wireless network 502, or in other words, the source address of an incoming packet.

Alternatively or in addition, the NAT entity 532 or the gateway 530 is configured to send the mapped packet to the respective one of the wireless devices 510, e.g., on an already existing connection.

Alternatively or in addition, the NAT entity 532 or the gateway 530 is configured to map packets sent from the respective one of the wireless devices 510 (e.g., sent from the link-local address of the respective one of the wireless devices 510) to the router-side source address. This mapping of a packet from the respective one of the wireless devices 510 to the application node 540 may comprise setting a source address of the packet to the generated IPv6 address provided in the step 304 (e.g., given by the interface device 200). Alternatively or in addition, this mapping of a packet from the respective one of the wireless devices 510 to the application node 540 may comprise setting a destination address of the packet to the address recorded based on an incoming packet from the application node 540.

Alternatively or in addition, the NAT entity 532 or the gateway 530 is configured to send the mapped packet onwards towards the outside, i.e., in the communications network 550, e.g., to the application node 540.

A seventh component comprises the application node 540, e.g., an IoT application, running in a separate computer system (typically in a cloud environment) in the communications network 550.

Embodiments of the components are schematically illustrated in FIGS. 5 and/or 6.

Figure 7:
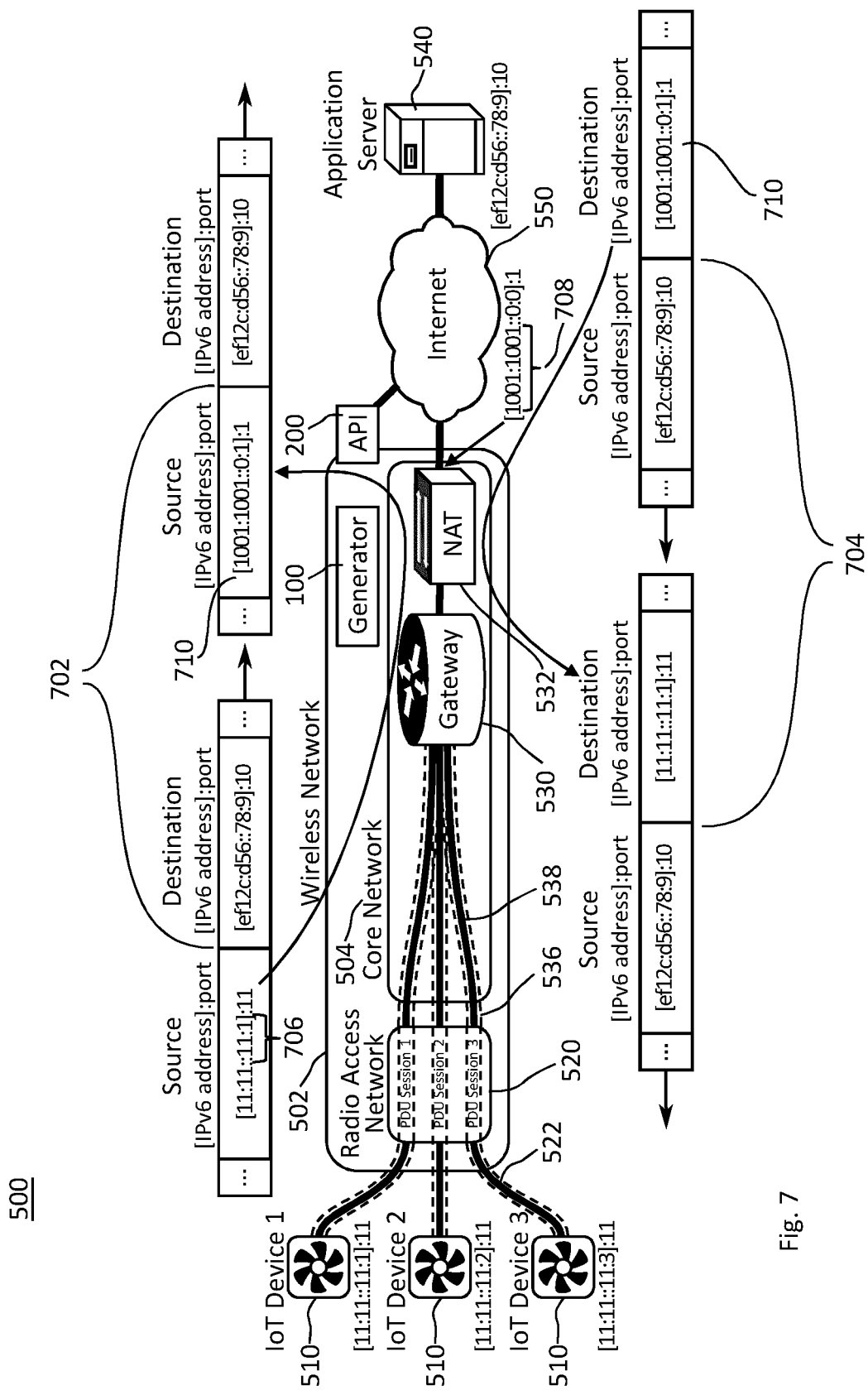
FIG. 7 shows a schematic block diagram of a third example of a communications system comprising embodiments of the devices of FIGS. 1 and 2 performing the methods of FIGS. 3 and 4, respectively.

FIG. 7 schematically illustrates a still further example of a communications system 500. The embodiments of generator device 100 and the interface device 200 or the components indicated by like reference signs may be implemented alone or in combination with the features described with reference to FIG. 5 or 6.

While a mapping performed by the NAT entity 532 according to the generated IPv6 address (e.g., as provided in the step 304) is described for a source address of outgoing traffic and/or for a destination address of incoming traffic, the NAT entity 532 may map a source socket comprising the source address and a source port of outgoing traffic and/or destination socket comprising the destination address and a destination port of incoming traffic.

Herein, the mapping may also be referred to a translation.

For a data packet 702 from the wireless devices 510 to the application node 540 (i.e., outgoing traffic), the NAT entity 532 maps a source address of the respective one of the wireless devices 510 (e.g., a link-local address of the respective one of the wireless devices 510) to the generated IPv6 address 710 of the respective one of the wireless devices 510. The device identifier 706 of the respective one of the wireless devices 510 may be the interface identifier of the link-local address of the respective one of the wireless devices 510. The generated IPv6 address 710 may comprise a subnet identifier 708 of an IPv6 address of the wireless network 510, e.g., a subnet identifier that is common to the generated IPv6 addresses 710 of the plurality of wireless devices 510 or a subnet identifier of an IPv6 address of the NAT entity 532.

The destination address of the outgoing data packet 702 may be unchanged by the NAT entity 532.

For a data packet 704 from the application node 540 to one of the wireless devices 510 (i.e., incoming traffic), the NAT entity 532 maps a destination address that is the generated IPv6 address 710 of the respective one of the wireless devices 510 to an address of the respective one of the wireless devices 510 in an address space of the wireless network 502, e.g., to the link-local address of the respective one of the wireless devices 510.

The source address of the incoming data packet 704 may be unchanged by the NAT entity 532.

The gateway 530 sends a data packet (e.g., the data packet 704 after the mapping) on a tunnel 538 to the respective one of the wireless devices 510 based on a data packet 704 incoming from the communications network 550 (e.g., the data packet 704 before the mapping), if the incoming data packet 704 is indicative of the generated IPv6 address of the respective one of the wireless devices 510 and/or if the incoming data packet 704 after the mapping is indicative of an (e.g., IPv6) address of the respective one of the wireless devices 510 (e.g., the link-local address of the respective one of the wireless devices 510) in the address space of the wireless network 502.

The tunnel 538 may use a General Packet Radio Service (GPRS) Tunneling Protocol. Alternatively or in addition, the tunnel may extend between the gateway 530 and the wireless access network 520, e.g., a base station of the wireless access network 520.

The tunnel 538 may be (e.g., uniquely) associated with the respective one of the wireless devices 510. For example, a protocol data unit (PDU) session 536 between the gateway 530 and the respective one of the wireless devices 510 may (e.g., uniquely) associate the tunnel 538 and a data radio bearer (DRB) 522 between the wireless access network 520 and the respective one of the wireless devices 510.

Figure 8:
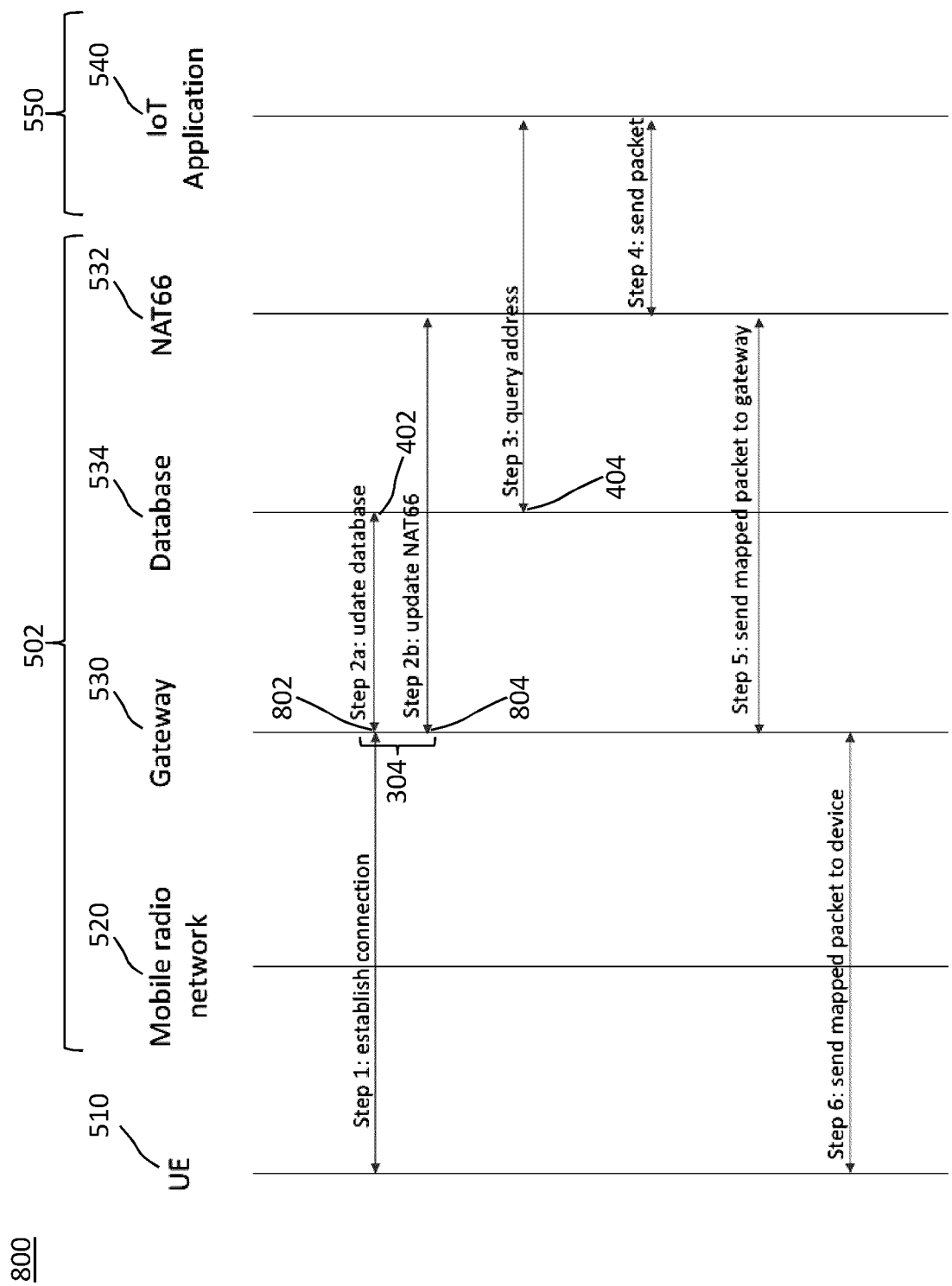
FIG. 8 schematically illustrates a signaling diagram resulting from embodiments of the devices of FIGS. 1 and 2 performing the methods of FIGS. 3 and 4, respectively.

FIG. 8 shows a schematic sequence diagram 800 resulting from embodiments of the technique performing the methods 300 and 400.

In a step 1, a connection between the respective one of the wireless devices 510 and the RAN 520 is established. Alternatively or in addition, the PDU session between the respective one of the wireless devices 510 and the gateway 530 is established. Step 1 may be performed in a usual manner and/or according to existing technical standards.

Based on the generated IPv6 address 710 of the step 302, the step 304 may comprise two sub-steps. In a first sub-step 2a at reference sign 802, an update message indicative of the generated IPv6 address for the respective one of the wireless devices 510 is sent to the interface device 200 and/or the database 534. The update message updates the database 534 and/or the interface device 200 to contain information about the allocation of the generated IPv6 address 710 for the respective one of the wireless devices 510.

Alternatively or in addition, in any embodiment, functionality of the gateway 530 and functionality of the database 534 may be integrated. In this case, the updating 802 and/or 804 may be an internal action in the gateway 530.

The step 402 of the method 400 may comprise the reception of the update message sent in the sub-step 802.

In a second sub-step 2b at reference sign 804, an update message indicative of the generated IPv6 address for the respective one of the wireless devices 510 is sent to the gateway 530 and/or the NAT entity 532 (e.g., a NAT66). The update message updates the translation table to contain information about the allocation of the generated IPv6 address 710 for the respective one of the wireless devices 510.

The NAT entity 532 is updated to be aware of the allocated generated IPv6 address, e.g., by indicating the interface identifier generated IPv6 address for the respective one of the wireless devices 510 if a prefix common to all wireless devices 510 is used. Alternatively, if the prefix of the generated IPv6 address (i.e., used for the translation table of the NAT entity 532) is not common (i.e. fixed) but each of the wireless device 510 gets its own prefix, the prefix is communicated in the sub-steps 802 and 804 for the respective one of the wireless devices 510 (e.g., to the interface device 200 or the database 534 as well as to the NAT entity 532, respectively).

Alternatively or in addition, the step 304 of providing the generated IPv6 address 710 may comprise both updating 802 the interface device 200 (e.g., the database 534) and updating 804 the NAT entity 532 (e.g., the gateway 530) by broadcasting the update message indicative of the generated IPv6 address for the respective one of the wireless devices 510 to the interface device 200 (e.g., the database 534) and the NAT entity 532 (e.g., the gateway 530).

The updating 802 and/or 804 may be indicative of both a prefix and a suffix (i.e., interface identifier) of the generated IPv6 address.

In any embodiment, the generating 302 of the IPv6 address may comprise the gateway 530 and/or the database 534 allocating a unique interface identifier 706 for the respective one of the wireless devices 510.

In a first variant of any embodiment, e.g. as illustrated by means of the sequence diagram 800, the operation (e.g., the mapping) of the NAT entity 532 (e.g., a NAT66) is performed for all wireless devices 510 in the wireless network 502. In a second variant of any embodiment, the operation of the NAT entity 532 is configured (or configurable) and/or communicated via the interface device 200.

The (e.g., IoT) application node 540 queries the interface device 200 (e.g., at the database 534 or the gateway 530) about the generated IPv6 addresses for the respective one or for each of the wireless devices 510 belonging to the application (i.e., associated with the application node 540) in a step 3. The application node 540 gets back the IPv6 address as a 128-bit IPv6 address according to the step 404 of the method 400.

The interface device 200 (e.g., the database 534) may use application credentials to determine which subset of the wireless devices 510 in the wireless network 502 belong to the application node 540 or the application or service of the application node. Alternatively or in addition, the application node 540 signals explicitly (e.g., in the request to the interface device 200) the one or more wireless devices it needs to access. The explicit signaling may use an identifier the database 534 can map to the one or more wireless devices 510. The identifier in the request may be an application-specific identifier configured to map to a set of wireless devices 510, or a Mobile Subscriber ISDN Number (MSISDN), or credentials of a subscriber identity module (SIM) of the respective one or each of the wireless devices 510, or an International Mobile Equipment Identity (IMEI) of the respective one or each of the wireless devices 510.

The (e.g., IoT) application node 540 sends an IPv6 packet destined to the generated IPv6 address (i.e., the address returned in the step 404) in a step 4.

In a step 5, the incoming packet is routed (e.g., in the normal way) through the Internet to the NAT entity 532 (e.g., a NAT66). The NAT entity 532 is aware of the generated IPv6 address based on the updating 804, and NAT entity 532 performs a mapping to the link-local address and associated interface identifier 706. The NAT entity 532 sends (e.g., forwards) the packet 704 with the mapped destination address to the gateway 530.

In a variant of any embodiment, the gateway 530 and the NAT entity 532 are part of the same node. In this case, the sending of the mapped packet may be an internal action.

The gateway 530 receives the mapped packet in a step 6, and forwards it to the connection (e.g., PDU session 536 and/or tunnel 538) towards the respective one of the wireless devices 510.

In at least some implementations, the gateway 530 needs to be aware that the incoming packet 704 has been mapped based on the generated IPv6 address 710, e.g., due to the packet 704 being received via a tunnel from a source address of the NAT 532, because normally a router of the gateway 530 would not forward link-local traffic from one link to another.

In a variant of any embodiment, the routing from the link between NAT entity 532 and gateway 530 to the link between gateway 530 and the respective one of the wireless devices 510 is indicated (e.g., triggered) by using the (e.g., actual) IPv6 prefix of the respective one of the wireless devices 510 in the mapped destination address, and/or by a shadow per-device prefix just for the operation of the NAT entity 532 according to the generated IPv6 address 710, and/or by a common prefix for all wireless devices 510 associated to the application node 540 (e.g., a prefix owned by the gateway 530), wherein different wireless devices 510 have different interface identifiers in the respectively generated IPv6 address 710.

Optionally, the technique may be specified according to one or several extensions of existing communications standards. For example, steps or features of the operation of the NAT entity 532 (e.g., the mapping, i.e., the translation) and/or the updating 802 and/or 804 may be specified. Alternatively or in addition, the interface device 200 (i.e., the exposure API) may be specified to provide the information (e.g., the generated IPv6 address 710) from the wireless network 502 to the (e.g., IoT) application node 540.

Any embodiment disclosed herein may relate to a cloud implementation, e.g., of an IoT application (or IoT service) provided or coordinated by the application node 540 using the access to the (e.g., IoT) wireless devices 510. Alternatively or in addition, any of the components of the communications system 500 may be implemented as a cloud service.

A further embodiment, which may be combined with any of the above embodiments, provides the capability to access (e.g., contact) the wireless devices 510 in the wireless network 502 (e.g., a mobile network), without knowing an IPv6 address used by the respective one of the wireless devices 510.

The technique may use the link-local address as the mapped destination address of an incoming packet 704, wherein the NAT entity 532 (e.g., a NAT66) performs the mapping (i.e., the translation according to a translation table).

A still further embodiment, which may be combined with any of the above embodiments, may comprise a wireless network 502 (e.g., a mobile network) that offers IPv6 connectivity to the wireless devices 510 (e.g., mobile devices) connected or connectable to the wireless network 502.

Alternatively or in addition, the wireless network 502 is aware of (e.g., the generator device 100 has access to a database storing) the link-local IPv6 address of the respective one or each of the wireless devices 510. Furthermore, the wireless network 502 is aware of a global IPv6 address prefix used by the device as an example of the subnet prefix 708. The wireless network 502 is not aware of a global IPv6 address suffix or a (e.g., full) IPv6 address of the respective one of the wireless devices 510, e.g., an IPv6 address used by the respective one of the wireless devices 510 as the source address when sending a packet into the IPv6 domain of the communications network 550.

Alternatively or in addition, the generated IPv6 address 710 as a result of the generating 302 (also referred to as constructing) performed by the generator device 100 in the wireless network 502 represents or is uniquely indicative of the respective one of the wireless devices 510 among the wireless devices 510 in the wireless network 502.

Alternatively or in addition, the interface device 200 sends 404 (e.g., publishes) the generated IPv6 address 710 (i.e., the constructed address) via an API to the (e.g., IoT) application node 540.

Alternatively or in addition, upon reception of packets 704 to the generated IPv6 address 710 (i.e., incoming packets), a gateway 530 and/or a NAT entity 532 (e.g., a NAT66) maps (i.e., translates) between the generated IPv6 address 710 and the link-local address (also referred to as link-local IPv6 address) of the respective one of the wireless devices 510, and/or sends the mapped packet 704 to the respective one of the wireless devices 510. The mapped packet 704 may be sent from the link-local address of the gateway 530 of the wireless network 502.

In any embodiment, the communications network 550 and the wireless network 502 may be connected (e.g., on a user plane) only through the gateway 530 and/or the NAT entity 532. Alternatively or in addition, the interface device 200 of the wireless network 502 may be exposed to the application node 540 in the communications network 550. For example, the interface device 200 has an IPv6 address in the communications network 550.

A still further aspect relates to a method of providing, to an application node in a communications network, an internet protocol (IP) address according to IP version 6 (IPv6) for access to a respective one of a plurality of wireless devices connected or connectable to a wireless network. The method comprises a step of sending a request message from the application node to an interface device (e.g., an application programming interface, API, device) of the wireless network. The request message is indicative of a request for access to the respective one of the wireless devices. The method further comprises a step of receiving a generated IPv6 address from the interface device in response to the request at the application node. The method further comprises a step of sending, from the application node a data packet destined to the generated IPv6 address.

Figure 9:
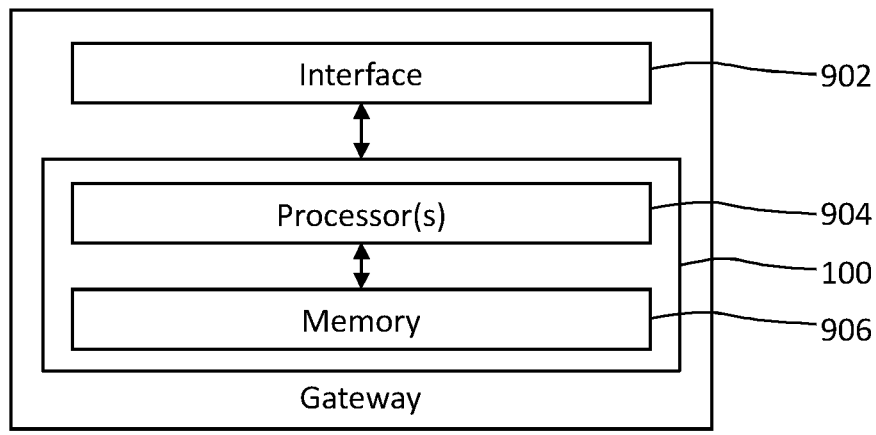
FIG. 9 shows a schematic block diagram of a gateway embodying the device of FIG. 1.

FIG. 9 shows a schematic block diagram for an embodiment of the generator device 100. The generator device 100 comprises processing circuitry, e.g., one or more processors 904 for performing the method 300 and memory 906 coupled to the processors 904. For example, the memory 906 may be encoded with instructions that implement at least one of the modules 102 and 104.

The one or more processors 904 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the generator device 100, such as the memory 906, generator functionality. For example, the one or more processors 904 may execute instructions stored in the memory 906. Such functionality may include providing various features and steps discussed herein, including any of the benefits disclosed herein. The expression "the device being operative to perform an action" may denote the generator device 100 being configured to perform the action.

As schematically illustrated in FIG. 9, the generator device 100 may be embodied by a gateway 530, e.g., functioning as a user plane function (UPF). The gateway 530 comprises an interface 902 coupled to the interface device 200.

Figure 10:
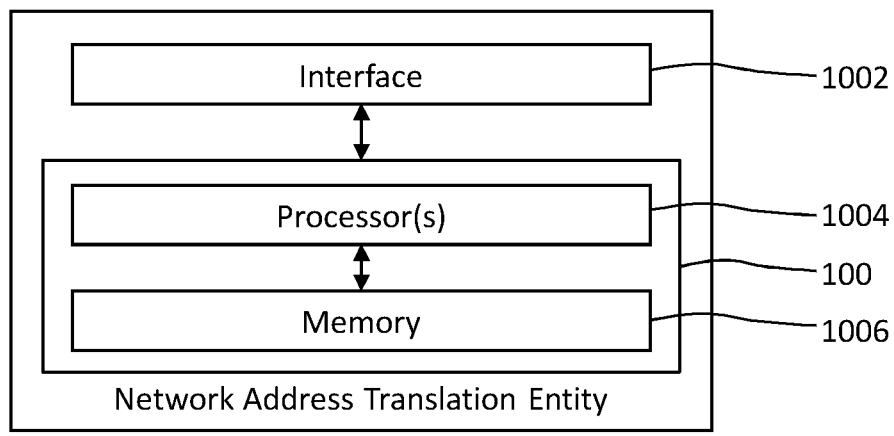
FIG. 10 shows a schematic block diagram of a NAT entity embodying the device of FIG. 1.

FIG. 10 shows a schematic block diagram for an embodiment of the generator device 100. The generator device 100 comprises processing circuitry, e.g., one or more processors 1004 for performing the method 300 and memory 1006 coupled to the processors 1004. For example, the memory 1006 may be encoded with instructions that implement at least one of the modules 102 and 104.

The one or more processors 1004 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1006, network address translation (NAT) functionality. For example, the one or more processors 1004 may execute instructions stored in the memory 1006. Such functionality may include providing various features and steps discussed herein, including any of the benefits disclosed herein. The expression "the device being operative to perform an action" may denote the generator device 100 being configured to perform the action.

As schematically illustrated in FIG. 10, the generator device 100 may be embodied by a NAT entity 532, e.g., functioning as a gateway 530. The NAT entity 532 comprises an interface 1002 coupled to the interface device 200.

Figure 11:
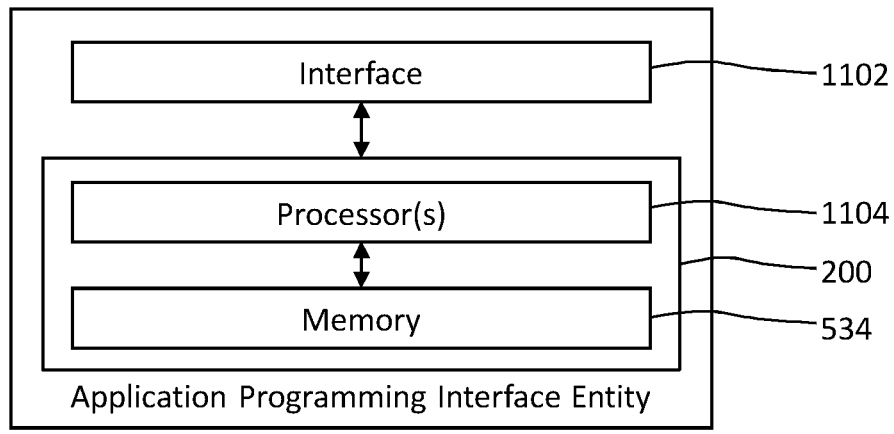
FIG. 11 shows a schematic block diagram of an API entity embodying the device of FIG. 2.

FIG. 11 shows a schematic block diagram for an embodiment of the interface device 200. The interface device 200 comprises processing circuitry, e.g., one or more processors 1104 for performing the method 400 and memory 1106 coupled to the processors 1104. For example, the memory 1106 may be encoded with instructions that implement at least one of the modules 202 and 204.

The one or more processors 1104 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the interface device 200, such as the memory 1106, interface (e.g., API) functionality. For example, the one or more processors 1104 may execute instructions stored in the memory 1106. Such functionality may include providing various features and steps discussed herein, including any of the benefits disclosed herein. The expression "the device being operative to perform an action" may denote the device 200 being configured to perform the action.

As schematically illustrated in FIG. 11, the interface device 200 may be embodied by an API entity 1100, e.g., functioning as a database 534. The API entity 1100 comprises an interface 1102 coupled to the interface device 200 for communication with the gateway 530 and/or the NAT entity 532.

Figure 12:
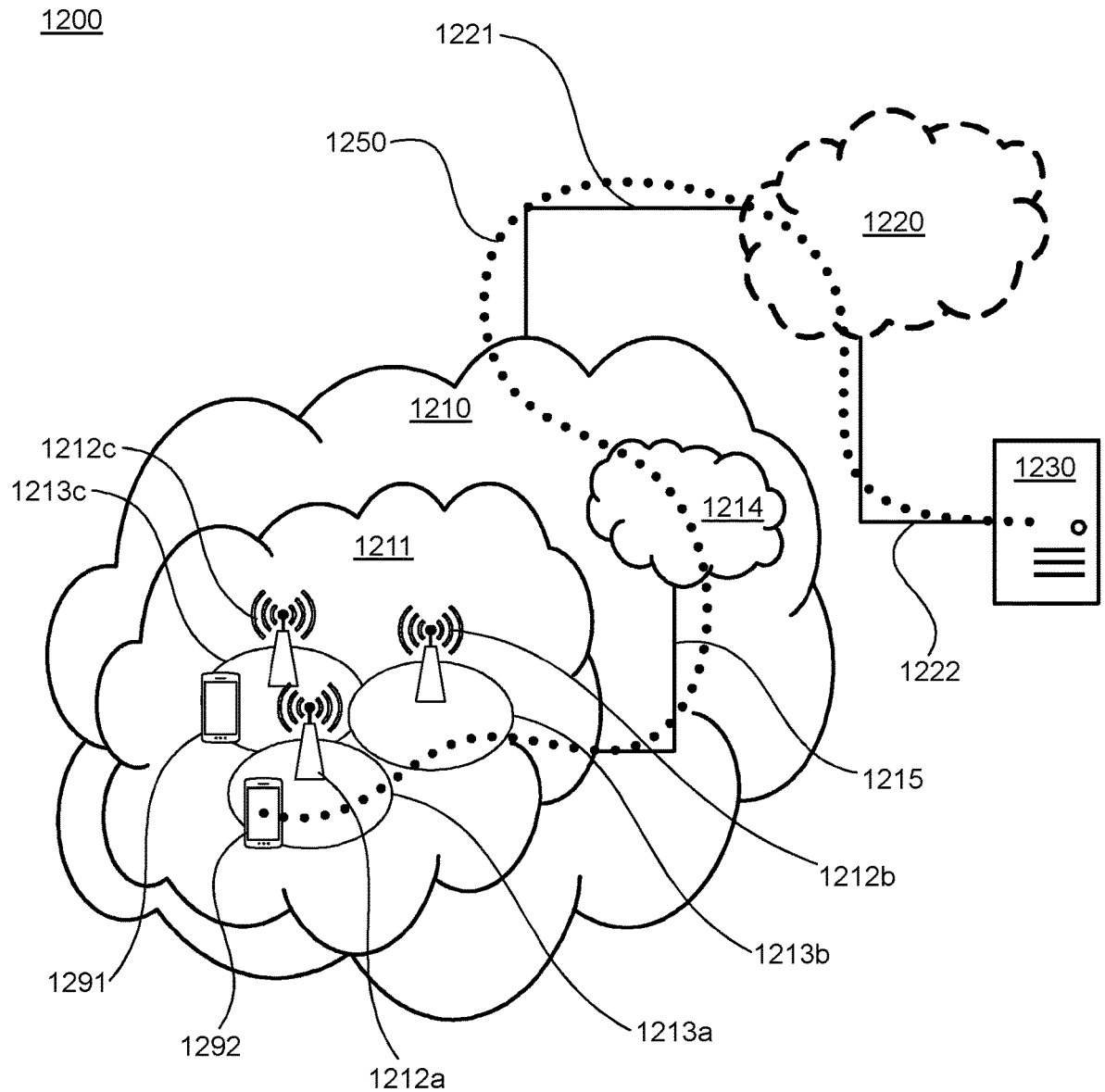
FIG. 12 schematically illustrates an example telecommunication network connected via an intermediate network to a host computer.

With reference to FIG. 12, in accordance with an embodiment, a communication system 1200 includes a telecommunication network 1210, such as a 3GPP-type cellular network, which comprises an access network 1211, such as a radio access network, and a core network 1214. The access network 1211 comprises a plurality of base stations 1212a, 1212b, 1212c, such as NBs, eNBs, gNBs or other types of wireless access points, each defining a corresponding coverage area 1213a, 1213b, 1213c. Each base station 1212a, 1212b, 1212c is connectable to the core network 1214 over a wired or wireless connection 1215. A first user equipment (UE) 1291 located in coverage area 1213c is configured to wirelessly connect to, or be paged by, the corresponding base station 1212c. A second UE 1292 in coverage area 1213a is wirelessly connectable to the corresponding base station 1212a. While a plurality of UEs 1291, 1292 are illustrated in this example, the disclosed embodiments are equally applicable to a situation where a sole UE is in the coverage area or where a sole UE is connecting to the corresponding base station 1212.

Any of the base stations 1212 and the UEs 1291, 1292 may embody the device 100.

The telecommunication network 1210 is itself connected to a host computer 1230, which may be embodied in the hardware and/or software of a standalone server, a cloud-implemented server, a distributed server or as processing resources in a server farm. The host computer 1230 may be under the ownership or control of a service provider, or may be operated by the service provider or on behalf of the service provider. The connections 1221, 1222 between the telecommunication network 1210 and the host computer 1230 may extend directly from the core network 1214 to the host computer 1230 or may go via an optional intermediate network 1220. The intermediate network 1220 may be one of, or a combination of more than one of, a public, private or hosted network; the intermediate network 1220, if any, may be a backbone network or the Internet; in particular, the intermediate network 1220 may comprise two or more sub-networks (not shown).

The communication system 1200 of FIG. 12 as a whole enables connectivity between one of the connected UEs 1291, 1292 and the host computer 1230. The connectivity may be described as an over-the-top (OTT) connection 1250. The host computer 1230 and the connected UEs 1291, 1292 are configured to communicate data and/or signaling via the OTT connection 1250, using the access network 1211, the core network 1214, any intermediate network 1220 and possible further infrastructure (not shown) as intermediaries. The OTT connection 1250 may be transparent in the sense that the participating communication devices through which the OTT connection 1250 passes are unaware of routing of uplink and downlink communications. For example, a base station 1212 need not be informed about the past routing of an incoming downlink communication with data originating from a host computer 1230 to be forwarded (e.g., handed over) to a connected UE 1291. Similarly, the base station 1212 need not be aware of the future routing of an outgoing uplink communication originating from the UE 1291 towards the host computer 1230.

By virtue of the method 300 being performed by a gateway in the wireless network 1210 and/or any one of the base stations 1212, and/or by virtue of the method 400 being performed by an interface device 200 exposed towards the communications network 1220, the performance or range of the OTT connection 1250 can be improved, e.g., in terms of increased throughput and/or reduced latency. More specifically, the host computer 1230 (e.g., acting as the application node 540) may take the imitative to access all or individual UEs 1291 and 1292 as embodiments of the wireless devices 510.

Example implementations, in accordance with an embodiment of the UE, base station and host computer discussed in the preceding paragraphs, will now be described with reference to FIG. 13. In a communication system 1300, a host computer 1310 comprises hardware 1315 including a communication interface 1316 configured to set up and maintain a wired or wireless connection with an interface of a different communication device of the communication system 1300. The host computer 1310 further comprises processing circuitry 1318, which may have storage and/or processing capabilities. In particular, the processing circuitry 1318 may comprise one or more programmable processors, application-specific integrated circuits, field programmable gate arrays or combinations of these (not shown) adapted to execute instructions. The host computer 1310 further comprises software 1311, which is stored in or accessible by the host computer 1310 and executable by the processing circuitry 1318. The software 1311 includes a host application 1312. The host application 1312 may be operable to provide a service to a remote user, such as a UE 1330 connecting via an OTT connection 1350 terminating at the UE 1330 and the host computer 1310. In providing the service to the remote user, the host application 1312 may provide user data, which is transmitted using the OTT connection 1350. The user data may depend on the location of the UE 1330. The user data may comprise auxiliary information or precision advertisements (also: ads) delivered to the UE 1330. The location may be reported by the UE 1330 to the host computer, e.g., using the OTT connection 1350, and/or by the base station 1320, e.g., using a connection 1360.

The communication system 1300 further includes a base station 1320 provided in a telecommunication system and comprising hardware 1325 enabling it to communicate with the host computer 1310 and with the UE 1330. The hardware 1325 may include a communication interface 1326 for setting up and maintaining a wired or wireless connection with an interface of a different communication device of the communication system 1300, as well as a radio interface 1327 for setting up and maintaining at least a wireless connection 1370 with a UE 1330 located in a coverage area (not shown in FIG. 13) served by the base station 1320. The communication interface 1326 may be configured to facilitate a connection 1360 to the host computer 1310. The connection 1360 may be direct, or it may pass through a core network (not shown in FIG. 13) of the telecommunication system and/or through one or more intermediate networks outside the telecommunication system. In the embodiment shown, the hardware 1325 of the base station 1320 further includes processing circuitry 1328, which may comprise one or more programmable processors, application-specific integrated circuits, field programmable gate arrays or combinations of these (not shown) adapted to execute instructions. The base station 1320 further has software 1321 stored internally or accessible via an external connection.

The communication system 1300 further includes the UE 1330 already referred to. Its hardware 1335 may include a radio interface 1337 configured to set up and maintain a wireless connection 1370 with a base station serving a coverage area in which the UE 1330 is currently located. The hardware 1335 of the UE 1330 further includes processing circuitry 1338, which may comprise one or more programmable processors, application-specific integrated circuits, field programmable gate arrays or combinations of these (not shown) adapted to execute instructions. The UE 1330 further comprises software 1331, which is stored in or accessible by the UE 1330 and executable by the processing circuitry 1338. The software 1331 includes a client application 1332. The client application 1332 may be operable to provide a service to a human or non-human user via the UE 1330, with the support of the host computer 1310. In the host computer 1310, an executing host application 1312 may communicate with the executing client application 1332 via the OTT connection 1350 terminating at the UE 1330 and the host computer 1310. In providing the service to the user, the client application 1332 may receive request data from the host application 1312 and provide user data in response to the request data. The OTT connection 1350 may transfer both the request data and the user data. The client application 1332 may interact with the user to generate the user data that it provides.

Figure 13:
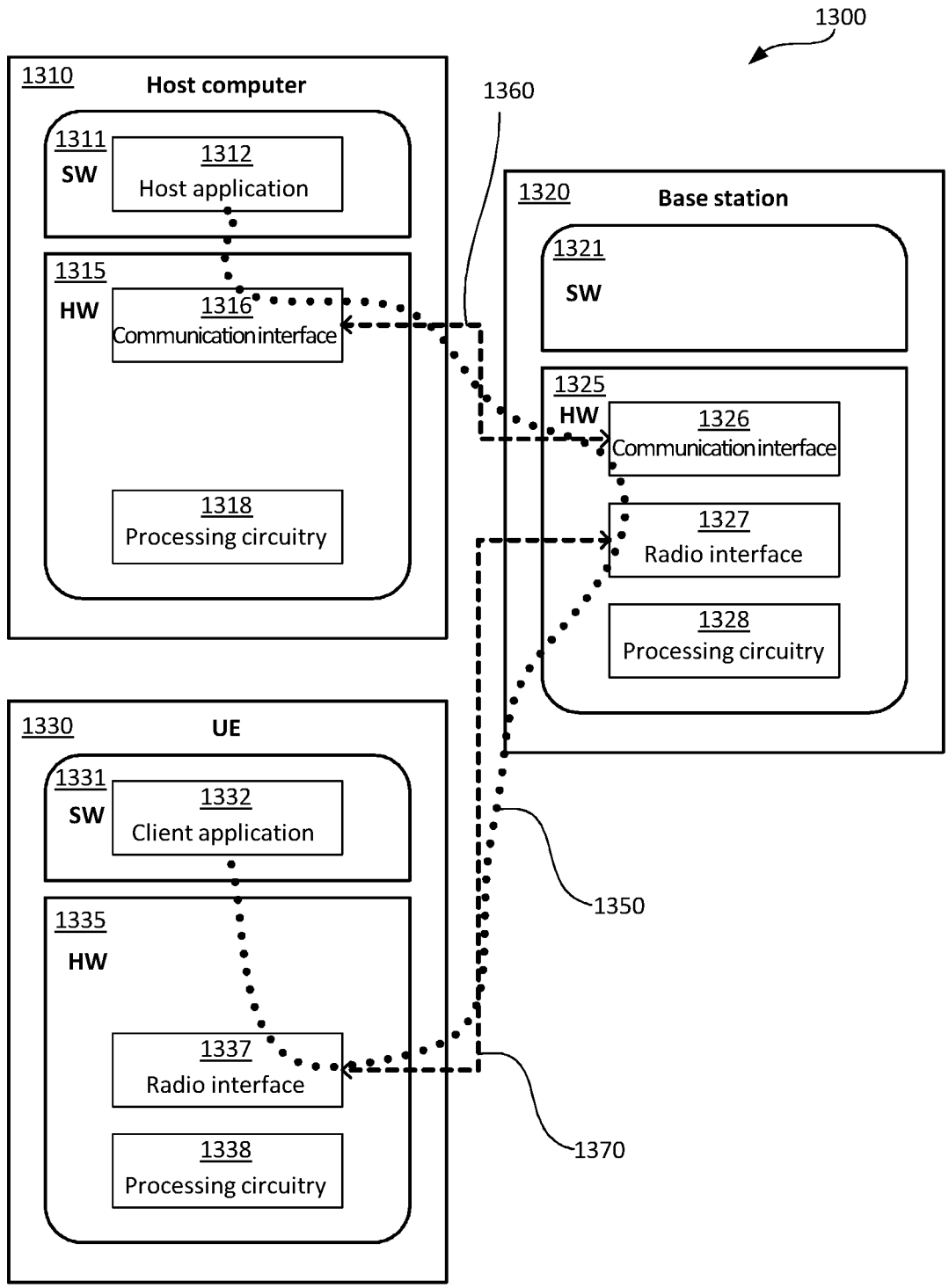
FIG. 13 shows a generalized block diagram of a host computer communicating via a base station or radio device functioning as a gateway with a user equipment over a partially wireless connection.

It is noted that the host computer 1310, base station 1320 and UE 1330 illustrated in FIG. 13 may be identical to the host computer 1230, one of the base stations 1212*a*, 1212*b*, 1212*c* and one of the UEs 1291, 1292 of FIG. 12, respectively. This is to say, the inner workings of these entities may be as shown in FIG. 13, and, independently, the surrounding network topology may be that of FIG. 12.

In FIG. 13, the OTT connection 1350 has been drawn abstractly to illustrate the communication between the host computer 1310 and the UE 1330 via the base station 1320, without explicit reference to any intermediary devices and the precise routing of messages via these devices. Network infrastructure may determine the routing, which it may be configured to hide from the UE 1330 or from the service provider operating the host computer 1310, or both. While the OTT connection 1350 is active, the network infrastructure may further take decisions by which it dynamically changes the routing (e.g., on the basis of load balancing consideration or reconfiguration of the network).

The wireless connection 1370 between the UE 1330 and the base station 1320 is in accordance with the teachings of the embodiments described throughout this disclosure. One or more of the various embodiments improve the performance of OTT services provided to the UE 1330 using the OTT connection 1350, in which the wireless connection 1370 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1350 between the host computer 1310 and UE 1330, in response to variations in the measurement results. The measurement procedure and/or the network functionality for reconfiguring the OTT connection 1350 may be implemented in the software 1311 of the host computer 1310 or in the software 1331 of the UE 1330, or both. In embodiments, sensors (not shown) may be deployed in or in association with communication devices through which the OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of the OTT connection 1350 may include message format, retransmission settings, preferred routing etc.; the reconfiguring need not affect the base station 1320, and it may be unknown or imperceptible to the base station 1320. Such procedures and functionalities may be known and practiced in the art. In certain embodiments, measurements may involve proprietary UE signaling facilitating the host computer's 1310 measurements of throughput, propagation times, latency and the like. The measurements may be implemented in that the software 1311, 1331 causes messages to be transmitted, in particular empty or "dummy" messages, using the OTT connection 1350 while it monitors propagation times, errors etc.

Figures 14, 15:
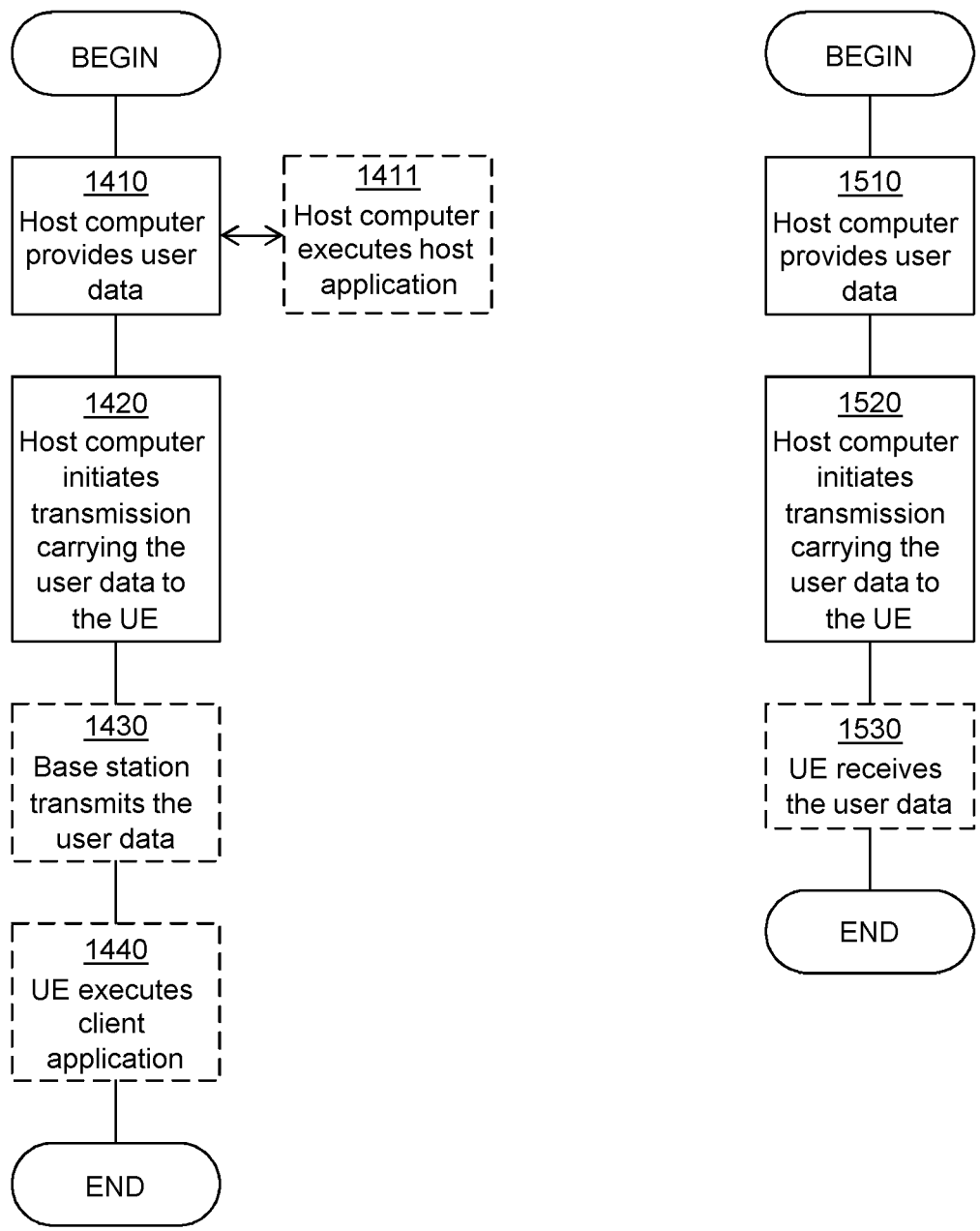
FIGS. 14 and 15 show flowcharts for methods implemented in a communication system including a host computer, a base station or radio device functioning as a gateway and a user equipment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this paragraph. In a first step 1410 of the method, the host computer provides user data. In an optional substep 1411 of the first step 1410, the host computer provides the user data by executing a host application. In a second step 1420, the host computer initiates a transmission carrying the user data to the UE. In an optional third step 1430, the base station transmits to the UE the user data which was carried in the transmission that the host computer initiated, in accordance with the teachings of the embodiments described throughout this disclosure. In an optional fourth step 1440, the UE executes a client application associated with the host application executed by the host computer.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this paragraph. In a first step 1510 of the method, the host computer provides user data. In an optional substep (not shown) the host computer provides the user data by executing a host application. In a second step 1520, the host computer initiates a transmission carrying the user data to the UE. The transmission may pass via the base station, in accordance with the teachings of the embodiments described throughout this disclosure. In an optional third step 1530, the UE receives the user data carried in the transmission.

As opposed to the IPv6 address, the IPv4 uses a 32-bit address space. It is still deployed everywhere and almost all systems support it. The address space has run out, and today addresses are commonly traded. Using the IPv4 address space to access the wireless devices (e.g., as a server) would therefore have a monetary cost.

The IPv6 domain of the communications network 550 and/or the wireless network 502 uses a 128-bit address space. These IPv6 addresses as global addresses are easily available, and even a single wireless device 510 may have a large address space to use for itself. While IPv6 is not yet deployed everywhere, large content providers and a fair number of large network operators have deployed it. IPv6 reachability from end user devices commonly used content systems (such as those at Google) is somewhere around 35% today, and in some countries around 50%.

Network Address Translators (NATs) were originally implemented to deal with the shortage of IPv4 addresses. A NAT in front of several end user devices makes it possible for these devices to share a single public address. Today, NATs are prevalent, most home network gateways, for instance, have this function. Many operators also have carrier-grade NATs, i.e. systems that perform a NAT function between the internet and a large number of end users.

Technically, a NAT maps 5-tuples (source and destination addresses and ports and protocol) to other 5-tuples. Typically, a NAT is placed between an internal network and the public Internet, and the mapping causes an internal IPv4 address (e.g., 10.x.x.x address) to be mapped to the NAT's public IP address. At the same time, the transport protocol port numbers used in the internal network get mapped to whatever port numbers happen to be available at the NAT's public IP address. All users behind the NAT need to share the same IP address and the port number space. The port number space is 16 bits for incoming traffic, so only a limited number of simultaneous connections can be supported. Typically, NATs maintain a limited number of entries about connections they know about, and remove these entries after some time has passed without any traffic on that connection.

The main downside of NATs is that it is not easy to build servers that are reachable behind them. Or, at least, frequent keepalive messaging is required to keep a connection alive, due to the removal of the NAT entries.

There are multiple types of NATs. An IPv4 NAT (abbreviated by "NAT44") relating two IPv4 domains is the original form of the NAT. A NAT64 is a NAT used for mapping an internally IPv6-only network to IPv4, such that for instance one can communicate with an IPv4-only web site. A NAT66 maps from one IPv6 address space to another IPv6 address space. These are not normally needed, but may be beneficially applied according to the subject technique in the NAT entity.

In any embodiment of the technique, IPv6 addresses other than the generated IPv6 addresses may be assigned in the wireless network 502 according to the following address assignment.

As described in the 3GPP document TS 23.402, version 17.0.0 and/or the 3GPP document TS 29.061, version 17.3.0, the wireless network 502 (e.g., as a 3GPP mobile network) may offer IPv4 and/or IPv6 connectivity to the wireless devices 510.

For IPv4, the PDP connection type IPv4 is used. Depending on the operator and the type of users, the device is assigned either a private (e.g., "net 10") address or a public address. In either case, the full address, 32 bits, is assigned.

If a private address is used, a NAT exists somewhere in the mobile network, converting private addresses to shared public addresses. Only some forms of communication may be possible via these NATs, e.g., because it is difficult to reach a device behind the NAT.

The mapping that the NAT performs is as follows:
For packets from the device:
A private source address is mapped to a public address held by the NAT.
A destination address is unchanged.
Port assignments for UDP/TCP connections are mapped such that a port reserved for a particular device in the NAT's IP address is used.
For packets to the device:
The source address is unchanged.
The destination address (NAT's own address) is mapped to a private address corresponding to the address that the device used.
Port assignments are mapped back to a reverse of what they were in the original packet sent from the device.

For pure IPv6 connectivity, the PDP connection type IPv6 is used. In addition, the PDP connection type IPv4IPv6 provides the ability to use both, or the connection that is available in this network. Only a 64-bit prefix is assigned for any IPv6 addresses, however. This follows the traditional IPv6 address assignment model where hosts can use a number of different "interface identifiers", i.e., 64-bit suffixes together with the globally routable prefix, and the concatenation of the prefix and the interface identifier forms the actual 128-bit address. This is commonly used, e.g., by Android phones for privacy-addresses so that the phone picks a different address for different communications or at different times, even if the 64-bit prefix stays the same for a longer period of time. Packets sent to any address within the prefix are routed to the device by the mobile network. However, typical IP stack implementations drop received packets if they do not match a currently configured interface identifier.

In addition to the address assignment for the general, globally routable prefixes there is an additional procedure for IPv6 link local address assignment. Link local addressing can only be used for communication on a link, and in the case of mobile networks that is only the device and the GGSN and/or PDN gateway that are on the point-to-point link that a PDP connection represents.

The link local address procedure in mobile networks consists of the network (GGSN or PDN gateway) sending an interface identifier to the device. The device is required to configure this interface identifier for use with link local communication but is not required to use it for any other prefixes, such as the global prefixes. In general, there is therefore no guarantee that a specific device implementation would use any particular interface identifier.

In some cases, if only IPv6 communications are used, there may be a "NAT64" installed in the mobile network. The purpose of this NAT64 is to map all IPv6 communications to either IPv6 or IPv4 communications, depending on whether the destination is in the IPv4 or IPv6 Internet. This allows the network and devices to operate in an IPv6-only model, simplifying the network.

The address mapping is then:
For packets sent from the device:
If the destination is in the IPv6 Internet, no mapping is performed.
If the destination is in the IPv4 Internet (as seen from a specifically crafted IPv6 address), the packet is converted to an IPv4 packet:
Source address set to the NAT64's own IPv4 address
Destination address set to the destination indicate in the specifically crafted address.
Ports are again mapped as in the IPv4 NAT case.
For packets sent to the device:
If the packet is an IPv6 packet, no mapping is performed.
If the packet is an IPv4 packet, the packet is converted to an IPv6 packet:
Source address is set to a specifically crafted IPv6 address representing the IPv4 source address.
Destination address is set to the devices' IPv6 address.
Ports are again mapped back.

The connections and usage of IPv6 may be implemented according to the Request for Comments (RFC) 6459.

The application node 540 and the wireless devices 510 may implement at least one of the following communication models.

In a first communication model, the wireless device 510 acts always as a client. This communication model works well in any type of connection type and whether or not there is a NAT of any kind.

In a second communication model, the wireless device 510 can also be contacted from outside, e.g., from the application node 540 as a cloud part of an IoT application. This requires the wireless device to act as a server. Being a server requires access to the server. This access can be achieved by embodiments of the technique. For example, the application node as an external party knows what address as the generated IPv6 address 710 (and port) to use to access (i.e., to reach) the respective one of the wireless devices 510.

The generated IPv6 address may be sent to the application node as an initial configuration of the application node 540 and/or in response to a request (i.e., a query) from the application node 540.

Alternatively or in addition, the wireless device 510 may initially register itself with the application node 540. The wireless device 510 uses the generated IPv6 address 710 as a reachable and stable address (and port). Optionally, the wireless device 510 may open an initial connection through a firewall and/or the NAT entity 532 and then keep that connection alive such that data packets from the outside can reach the wireless device 510.

Furthermore, the technique may be implemented with or without a future 3GPP-specified 128-bit addressing in the wireless network 502, e.g., for an addressing model for IPv6, i.e., a 128-bit address assignment model. While in such a model the wireless network 502 might have enough information about the addresses of the wireless device 510, which could be distributed via APIs to IoT application nodes 540, the technique may be realized without changing implementations of the wireless devices 510, and/or without changing an interface between the wireless device 510 and the wireless network 502, and/or by use of NAT66 as the NAT entity 532 for a mapping between the generated IPv6 addresses and link-local communications.

As has become apparent from above description, at least some embodiments of the technique allow for IPv6-based (e.g., IoT) wireless devices to be sent messages from an (e.g., IoT) application node, preferably without those wireless devices having to register their full 128-bit IPv6 address to the application node. Embodiments of the technique can save some communication effort and/or allows a mode of operating the wireless devices, wherein the wireless devices are normally inactive and/or do not initiate any action or communication unless requested to do so, e.g., by the application node. Alternatively or in addition, the wireless network (e.g., an interface device, optionally an API) can assist or control the application node in reaching the wireless devices.

Same or further embodiments allow a full IPv6-reachability to wireless devices in a communication that is initiated by the application node and/or controlled through the interface device (e.g., through an API) of the wireless network, optionally without requiring additional standardization or changes in the wireless devices themselves.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of generating an internet protocol, IP, address according to IP version 6, IPv6, for access to one of a plurality of wireless devices connected or connectable to a wireless network from an application node in a communications network, the wireless network comprising a generator device, the wireless network and the communications network being different, the method comprising:
generating, by the generator device, an IPV6 address for access from the application node in the communications network to a respective one of the wireless devices, the IPv6 address being generated based on a subnet identifier of the wireless network and a device identifier of the respective one of the wireless devices; and
providing the generated IPV6 address for the access from the application node in the communications network.

2. The method of claim 1, wherein at least one or each of the device identifier and the subnet identifier is an IPV6 address or a part thereof.

3. The method of claim 1, wherein the subnet identifier is a subnet prefix of the wireless network according to IPv6.

4. The method of claim 1, wherein the device identifier is uniquely indicative of the respective one of the wireless devices within the wireless network.

5. The method of claim 1, wherein the device identifier of the respective one of the wireless devices is an interface identifier of a link-local address of the respective one of the wireless devices in the wireless network according to IPv6.

6. The method of claim 1, further comprising:
assigning, to the respective one or each of the wireless devices, the device identifier of the respective wireless device.

7. The method of claim 1, wherein the communications network is a packet data network, PDN.

8. The method of claim 1, wherein the generated IPv6 address is uniquely indicative of the respective one of the wireless devices in an address space of the communications network.

9. The method of claim 1, wherein the generating of the generated IPv6 address comprises one or both:
assigning one 64-bit prefix jointly for all of the plurality of wireless devices; and
assigning different 64-bit suffixes for different wireless devices in the plurality of wireless devices.

10. The method of claim 1, wherein the generating of the generated IPv6 address comprises:
assigning different 64-bit prefixes and different 64-bit suffixes for different wireless devices in the wireless network.

11. A computer storage medium storing program code portions for performing a method when the computer program is executed on one or more computing devices, the method being for generating an internet protocol, IP, address according to IP version 6, IPv6, for access to one of a plurality of wireless devices connected or connectable to a wireless network from an application node in a communications network, the wireless network comprising a generator device associated with the computer storage medium, the wireless network and the communications network being different, the method comprising:
generating, by the generator device, an IPV6 address for access from the application node in the communications network to a respective one of the plurality of wireless devices connected or connectable to the wireless network, the IPv6 address being generated based on a subnet identifier of the wireless network and a device identifier of the respective one of the wireless devices; and
providing the generated IPV6 address for the access from the application node in the communications network.

12. A generator device configured to generate an internet protocol, IP, address according to IP version 6, IPv6, for access to one of a plurality of wireless devices connected or connectable to a wireless network from an application node in a communications network, the generator device being usable in the wireless network, the wireless network and the communications network being different, the generator device comprising processing circuitry operative to cause the generator device to:
generate an IPV6 address for access from the application node in the communications network to a respective one of the wireless devices, the IPV6 address being generated based on a subnet identifier of the wireless network and a device identifier of the respective one of the wireless devices; and
provide the generated IPV6 address for the access from the application node in the communications network.

13. The generator device of claim 12, wherein at least one or each of the device identifier and the subnet identifier is an IPV6 address or a part thereof.

* * * * *